United States Patent
Buttgenbach et al.

(10) Patent No.: US 12,334,744 B2
(45) Date of Patent: Jun. 17, 2025

(54) RENEWABLE ENERGY SYSTEM WITH TUNABLE VARIABILITY

(71) Applicant: 8ME NOVA, LLC, San Francisco, CA (US)

(72) Inventors: Thomas Buttgenbach, Santa Monica, CA (US); Lukas Mercer Hansen, El Dorado Hills, CA (US); Michael Healy, Santa Monica, CA (US); Gautham Ramesh, Emeryville, CA (US); Finbar Sheehy, San Francisco, CA (US); Carl Stills, Brawley, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 0 days.

(21) Appl. No.: 17/589,749

(22) Filed: Jan. 31, 2022

(65) Prior Publication Data

US 2023/0246453 A1    Aug. 3, 2023

(51) Int. Cl.
*H02J 3/46* (2006.01)
*H02J 3/32* (2006.01)

(52) U.S. Cl.
CPC ........ *H02J 3/46* (2013.01); *H02J 3/32* (2013.01); *H02J 2300/22* (2020.01)

(58) Field of Classification Search
CPC ............. H02J 3/46; H02J 3/32; H02J 2300/02
See application file for complete search history.

(56) References Cited

U.S. PATENT DOCUMENTS

| | | | |
|---|---|---|---|
| 7,929,327 B2 | 4/2011 | Haines et al. | |
| 2003/0158631 A1* | 8/2003 | Masuda | H02J 3/00 700/286 |
| 2006/0137349 A1* | 6/2006 | Pflanz | F28D 20/0052 60/641.2 |
| 2011/0148360 A1 | 6/2011 | Lee | |

(Continued)

FOREIGN PATENT DOCUMENTS

WO    WO-2016/077813 A1    5/2016

OTHER PUBLICATIONS

PCT International Prelim. Report on Patentability and Written Opinion dated Aug. 15, 2024 in International Application No. PCT/US2022/049279.

*Primary Examiner* — Rexford N Barnie
*Assistant Examiner* — Thai H Tran
(74) *Attorney, Agent, or Firm* — FOLEY & LARDNER LLP

(57) ABSTRACT

A method of adjusting energy delivered by a renewable energy system to an electrical grid and an energy-consuming load is disclosed. The method may comprise determining a production schedule of a renewable energy system (RES) and establishing a prioritization order between the electrical grid and the energy-consuming load. The method may further comprise setting a power receiving threshold for the electrical grid or the energy-consuming load based on the prioritization order, and adjusting the energy delivered by the RES by controlling a first amount of energy delivered to the electrical grid and a second amount of energy delivered to the energy-consuming load. A variability schedule of at (Continued)

least one of the first amount of energy or the second amount of energy can be amplified or dampened over a time period relative to the natural variability energy production schedule of the RES.

37 Claims, 13 Drawing Sheets

(56) References Cited

U.S. PATENT DOCUMENTS

| | | | |
|---|---|---|---|
| 2011/0208365 A1* | 8/2011 | Miller | H02J 3/14 |
| | | | 700/291 |
| 2019/0052094 A1* | 2/2019 | Pmsvvsv | H02J 3/32 |
| 2020/0395759 A1 | 12/2020 | Osborne et al. | |

* cited by examiner

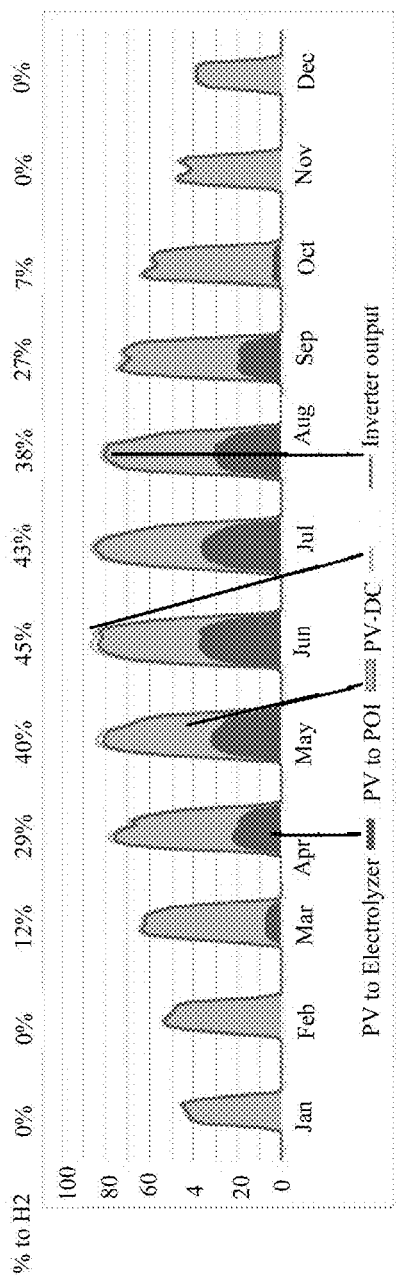
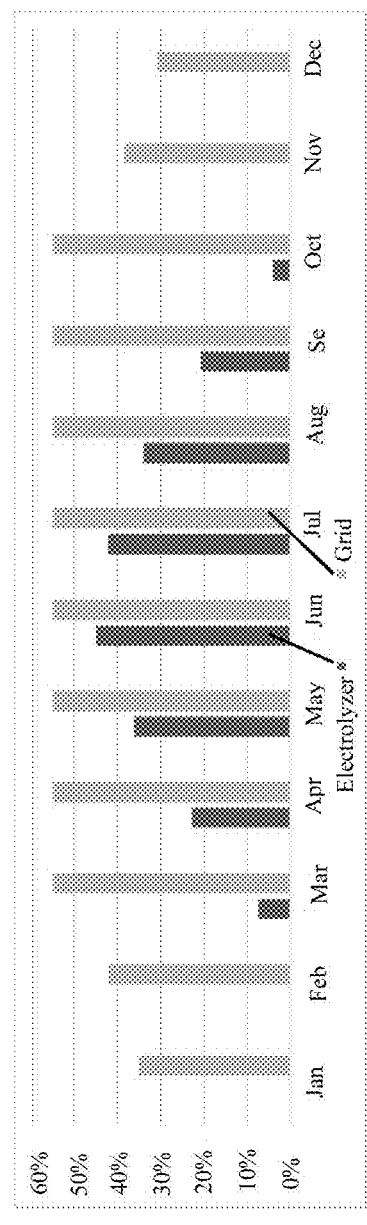
FIG. 12A
FIG. 12B

RENEWABLE ENERGY SYSTEM WITH TUNABLE VARIABILITY

BACKGROUND

Energy generated by a renewable energy system (RES) may vary seasonally. In some cases, energy generated by a solar RES can be higher during the summer months when periods of daylight are longer and when peak daytime power is higher; and lower during the winter months when periods of daylight are shorter and when peak daytime power is lower.

Electrical energy demand or electrical power demand from a grid may also exhibit variability. For example, in hot desert regions like the US Southwest, electrical energy demand from the grid can be highest during the summer months, because of air conditioning loads. Conversely, in other regions electrical energy demand from a grid can be highest in winter due to heating loads. Dependent on the geographical location, the climate, industries, and/or culture where the grid is operable, the energy demand or power demand from the grid may exhibit a variety of patterns.

In some cases, variability in energy generation by a RES and variability in energy demanded from a grid may be mismatched.

SUMMARY

The present disclosure provides systems and methods for partitioning energy delivered to an electrical load, such as a grid, from a renewable energy system (RES). In some cases, the RES may generate electrical energy according to a first variability, i.e., an expected pattern of energy generation over a period of time given the circumstances of renewable energy generation. Meanwhile, the electrical load may have electrical energy demand according to a second variability, wherein the second variability can be different from the first variability. In some aspects, the present disclosure describes systems and methods for adjusting energy delivered from the RES to the electrical load, such that the variability of energy delivery can be different from the variability of energy generation.

In some embodiments, a system of the present disclosure may comprise a RES in electrical communication with a grid and one or more auxiliary processes (i.e., in total, two or more separate electrical loads). In some embodiments, a rule may be established such that the grid or the auxiliary process is delivered energy with higher priority than the other. For example, a prioritization order may be established such that the grid has a higher power use priority over the auxiliary process. A power receiving threshold may then be established for the grid. The power receiving threshold may be a static number or a variable number, which sets a maximum to the amount of power that is first delivered to the higher priority load. In some cases, excess power over the power receiving threshold may be delivered to the auxiliary process. In some cases, the system can allow the variability of energy delivered to the grid to be adjusted passively or dynamically (e.g., the amount energy delivered each day, each week, and/or each month may be tuned). In some cases, the RES may be appropriately sized in view of the requirements of the grid, such that it may satisfy the amounts of energy or power generation required to tune the variability in energy delivery to the grid in accordance with a desired variability.

In some embodiments, the prioritization order may be established such that the auxiliary process has higher power use priority over the grid. An auxiliary process can refer to a process of any scale or application beyond providing grid electricity. The auxiliary process may be any one of various industrial processes, for example, industrial processes such as production of "green" hydrogen or "green" ammonia, metal smelting, cryptocurrency mining, "vertical" farming, powering server farms, water purification, glass production and various others. In some cases, the auxiliary process may have variability in electrical energy demand, for example, a "flat" variability of electrical energy demand. In some embodiments, a power receiving threshold may be established for the auxiliary process, such that the energy generated by the RES is first delivered to the auxiliary process to meet the electrical energy demand of the auxiliary process. In some embodiments, the remainder of energy may be used for other purposes including energy delivery to the grid.

In some embodiments, the power use may be partitioned in a predetermined proportion between the auxiliary process and the grid. In some cases, the predetermined proportion may be used to tune the variability of energy delivered to the auxiliary process such that the energy delivered substantially matches the energy requirements of the auxiliary process. In some cases, the predetermined proportion may be used to tune the variability of energy delivered to the grid such that the energy delivered substantially matches the energy requirements of the grid. In some cases, the predetermined proportion may be a static proportion. In some cases, the predetermined proportion may be a variable proportion.

In some aspects, the present disclosure describes a method of adjusting energy delivered by a renewable energy system (RES) to a plurality of loads comprising an electrical grid and an energy-consuming load, the method comprising: determining a natural variability energy production schedule of the RES; establishing a prioritization order for the plurality of loads such that a selected load in the plurality of loads has a higher power use priority over an unselected load in the plurality of loads; setting a power receiving threshold for the selected load based on the prioritization order; and adjusting the energy delivered by the RES by controlling a first amount of energy delivered to the selected load and a second amount of energy delivered to the unselected load, wherein a variability schedule of at least one of the first amount of energy or the second amount of energy is modified over a time period relative to the natural variability energy production schedule of the RES based at least in part on (i) the prioritization order and (ii) the power receiving threshold.

In some cases, the power receiving threshold is a fixed percentage or ratio of a maximum power output of the RES throughout the time period.

In some cases, the first amount of energy comprises energy generated by the RES in excess of the power receiving threshold that is set for the selected load.

In some cases, the variability schedule of the first amount of energy is modified such that its variance is larger relative to the natural variability energy production schedule of the RES. In some cases, the variability schedule of the second amount of energy is modified such that its variance is smaller relative to the natural variability energy production schedule of the RES. In some cases, the variability schedule of the first amount of energy is modified such that the variability schedule of the first amount of energy has a similar shape to the natural variability energy production schedule of the RES. In some cases, the variability schedule of the first amount of energy is modified such that the first amount of energy is substantially zero during one or more durations within the time period. In some cases, the variability schedule of the second amount of energy delivered to the energy-consuming load has a different shape than the natural variability energy production schedule of the RES.

In some cases, the power receiving threshold is a variable percentage or ratio of a maximum power output of the RES over different durations within the time period. In some cases, the power receiving threshold is varied seasonally, monthly, weekly, or daily. In some cases, the power receiving threshold is varied such that the second amount of energy delivered to the energy-consuming load follows a predetermined pattern. In some cases, the plurality of durations are on an annual cycle.

In some cases, the selected load is the energy-consuming load and the unselected load is the electrical grid. In some cases, the selected load is the electrical grid and the unselected load is the energy-consuming load.

In some aspects, the present disclosure describes a method of adjusting energy delivered by a renewable energy system (RES) to a plurality of loads comprising an electrical grid and an energy-consuming load, the method comprising: (a) determining a natural variability energy production schedule of the RES; and (b) adjusting the energy delivered by the RES by controlling (i) a first amount of energy delivered to a first load in the plurality of loads and (ii) a second amount of energy delivered to a second load in the plurality of loads in a predetermined proportion relative to each other throughout a daily duration, such that a variability schedule of at least one of the first amount of energy or the second amount of energy is modified over a time period relative to the natural variability energy production schedule of the RES. In some cases, the predetermined proportion is variable.

In some cases, a volatility of the natural variability energy production schedule of the RES is partitioned between the first load and the second load. In some cases, the volatility is partitioned such that substantially zero volatility is experienced by the first load. In some cases, the volatility is partitioned such that substantially zero volatility is experienced by the second load.

In some cases, the method does not require establishing a prioritization order between the first load and the second load such that one of the first load or the second load has a higher power use priority over the other. In some cases, the method does not require setting a power receiving threshold for the first load or the second load based on a prioritization order between the first load and second load.

In some aspects, the present disclosure describes a method of adjusting energy delivered by a renewable energy system (RES) to a plurality of loads comprising an electrical grid and an energy-consuming load, the method comprising: (a) determining a natural variability energy production schedule of the RES; and (b) adjusting the energy delivered by the RES by controlling (i) a first amount of energy delivered to a first load in the plurality of loads and (ii) a second amount of energy delivered to a second load in the plurality of loads in a variable ratio relative to each other throughout a plurality of durations, such that a variability schedule of at least one of the first amount of energy or the second amount of energy is modified over a time period relative to the natural variability energy production schedule of the RES. In some cases, the plurality of durations occur at a set of predefined time points on a daily basis. In some cases, the variability schedule of the second amount of energy delivered to the second load has a substantially flat profile. In some cases, the first load is the energy-consuming load and the second load is the electrical grid. In some cases, the first load is the electrical grid and the second load is the energy-consuming load.

In some cases, the method further comprises using an energy storage system (ESS) to modify a daily pattern of the first amount of energy. In some cases, the method further comprises using an energy storage system (ESS) to modify a daily pattern of the first amount of energy.

In some cases, the plurality of loads comprise a plurality of energy-consuming loads.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 12A shows a mean power generation and delivery in a 24-hour day in each month from a DURES implementing proportional energy splitting, in accordance with some embodiments.

FIG. 12B shows a monthly energy generation and delivery of a DURES implementing proportional energy splitting, in accordance with some embodiments.

DETAILED DESCRIPTION

Electrical energy generated by a RES may exhibit variability. In some cases, energy generated by a solar RES can be higher during summer when periods of daylight are longer and when peak daytime power is higher; and lower during winter when periods of daylight are shorter and when peak daytime power is lower.

Electrical energy demand or electrical power demand from a grid may also exhibit variability. For example, in hot desert regions like the US Southwest, electrical energy demand from the grid can be highest during the summer months, because of air conditioning loads. Conversely, in other regions electrical energy demand from a grid can be highest in winter due to heating loads. Dependent on the geographical location, the climate, industries, and/or culture where the grid is operable, the energy demand or power demand from the grid may exhibit different kinds of variability.

Electrical power demand from an auxiliary process may also exhibit variability. As used herein, an auxiliary process may refer to processes of various scales and applications beyond energy for the grid. Some examples of auxiliary process are: water electrolysis, rock crushing, bitcoin mining, vertical farming, ammonia production, and smelting.

In some aspects, the present disclosure describes a RES that is configured to deliver energy or power having tunable variability to an electrical grid, an auxiliary process, or both.

In some aspects, the present disclosure describes a method of partitioning energy or power generated by a RES between a grid and an auxiliary process. In some cases, the method may comprise delivering energy or power to the grid with tuned variability that is different from the variability of the energy or power generation of the RES. In some cases, the method may comprise delivering energy or power to the auxiliary process with tuned variability that is different from the variability of the energy or power generation of the RES.

The variabilities of the electrical energy or power generated by a RES, the electrical energy or power demand from a grid, and the electrical energy or power demand from an auxiliary process may each have different patterns and/or may have substantially similar patterns. The systems, methods, and devices of the present disclosure may be applicable to processes having various combinations of variabilities across multiple components (e.g., solar RES, wind RES, geothermal RES, grid, and/or various auxiliary processes).

RES

A RES can refer to a system configured to convert a renewable energy source into electrical energy. In some cases, a RES may be a solar RES. In some cases, a RES may be a wind RES. In some cases, a RES may be a geothermal RES. In some cases, RES may be tidal RES. In some cases, RES may be hydroelectric RES.

Figure 1A:
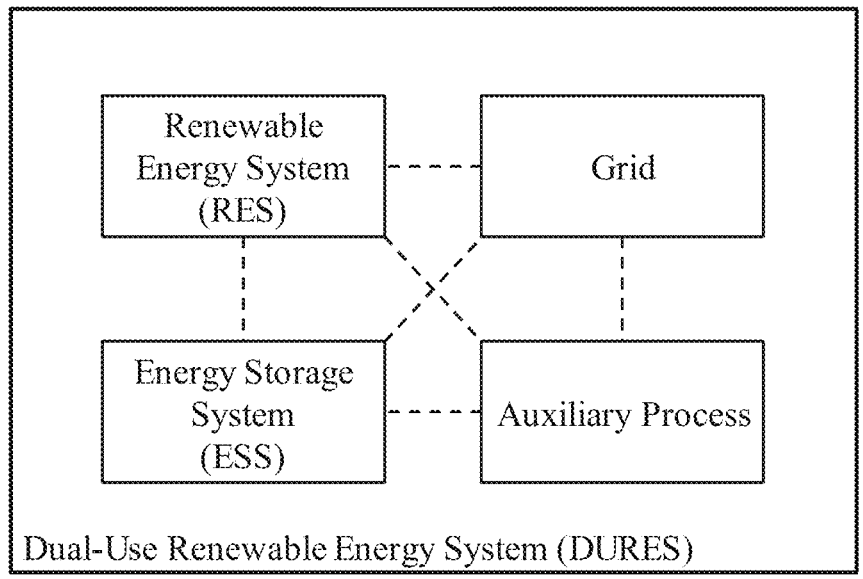
FIG. 1A schematically illustrates a dual-use renewable energy system (DURES), in accordance with some embodiments.

In some cases, a RES may be a DURES. FIG. 1A schematically illustrates a DURES, in accordance with some embodiments. As used herein, DURES can refer to a RES in electrical communication with a grid and an auxiliary process. In some cases, a DURES may also be in electrical communication with an energy storage system (ESS). In some cases, a DURES may be configured to deliver electrical energy to the grid, the auxiliary process, the ESS, or any combination thereof.

Figure 1B:
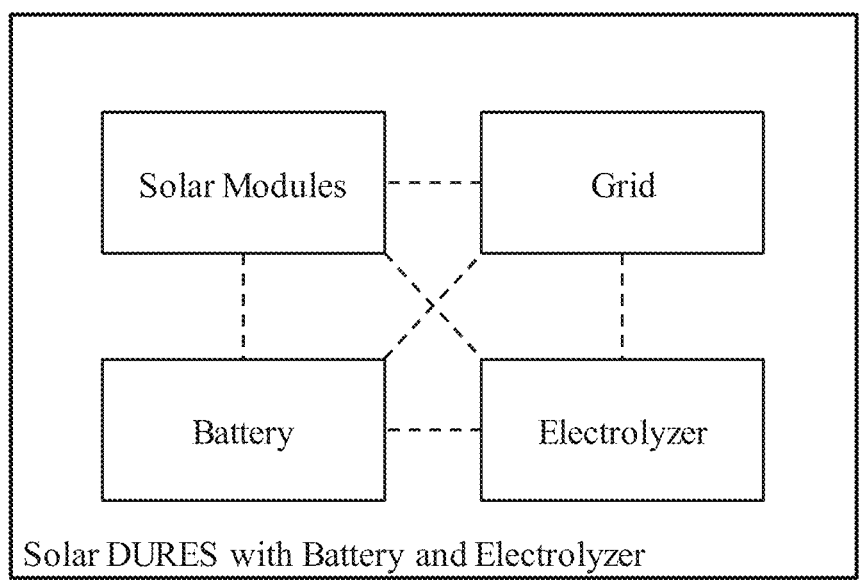
FIG. 1B schematically illustrates a DURES, in accordance with some embodiments.
Figure 2:
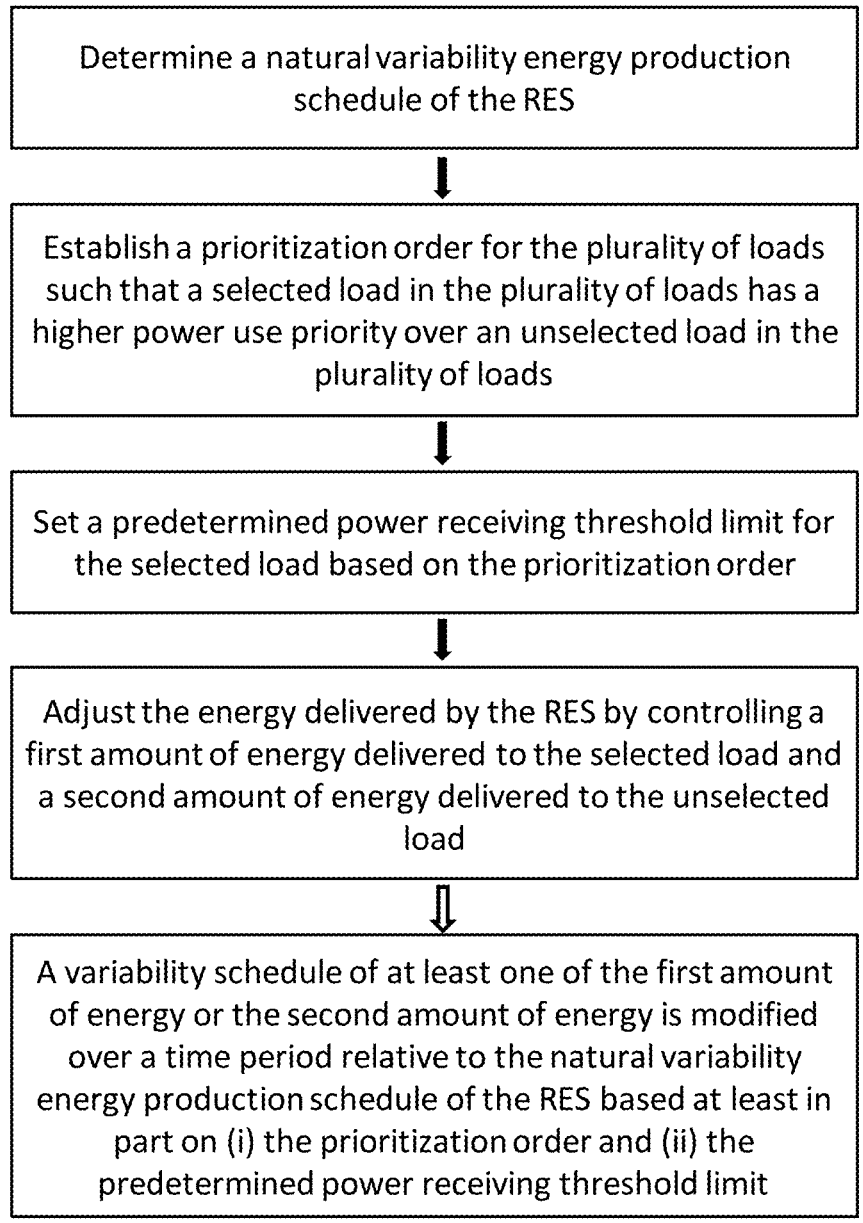
FIG. 2 schematically illustrates a method for tuning the variability of energy or power delivery from a DURES, in accordance with some embodiments.

As used herein, a solar RES can refer to a RES configured to convert solar energy into electrical energy. In some cases, a solar RES may be a solar DURES. FIG. 1B schematically illustrates a solar DURES, in accordance with some embodiments. As used herein, solar DURES can refer to a solar RES in electrical communication with a grid and an auxiliary process. In some cases, a solar DURES may be in electrical communication with an ESS. In some cases, a solar DURES may be configured to delivery electrical energy to the grid, the auxiliary process, the ESS, or any combination thereof.

In some cases, a RES may comprise one or more electrical loads. In some cases, a RES may comprise 1, 2, 3, 4, 5, 6, 7, 8, 9, 10, 20, 30, 40, 50, 60, 70, 80, 90, or 100 electrical loads. In some cases, an electrical load may be a grid load. In some cases, an electrical load may be an auxiliary process.

Auxiliary Process

Auxiliary processes can refer to processes of various scales and applications beyond grid power. In some cases, an auxiliary process may be configured to receive electrical energy from a RES. In some cases, an auxiliary process may be configured to receive electrical energy from a grid. In some cases, an auxiliary process may be configured to receive electrical energy from an ESS. Some examples of auxiliary process are: water electrolysis, rock crushing, bitcoin mining, vertical farming, ammonia production, and smelting. In some cases, an auxiliary process may comprise one or more energy-consuming loads.

Electrical Energy and Electrical Power

As used herein, "electrical energy" and "energy" may be used synonymously. As used herein, "electrical energy" and "energy" can refer to an amount of energy. As used herein, "electrical power" and "power" may be used synonymously. As used herein, "electrical power" and "power" can refer to an amount of energy per time.

As used herein, "energy generation" and "energy production" may be used synonymously. As used herein, "electrical energy" and "energy" can refer to an amount of energy generated or produced by an energy source. As used herein, "power generation" and "power production" may be used synonymously. As used herein, "power generation" and "power production" can refer to an amount of energy per time generated or produced by an energy source.

Variability

Variability of energy/power generation, energy/power demand, or energy/power consumption can refer to the property of having one or more recurrent patterns. In some cases, the one or more recurrent patterns have a timescale that is less than or equal to a year. In some cases, electrical energy or power generation of a RES, energy or power demand of a grid, and/or energy or power demand of an auxiliary process may have a variability pattern.

Figure 3A:
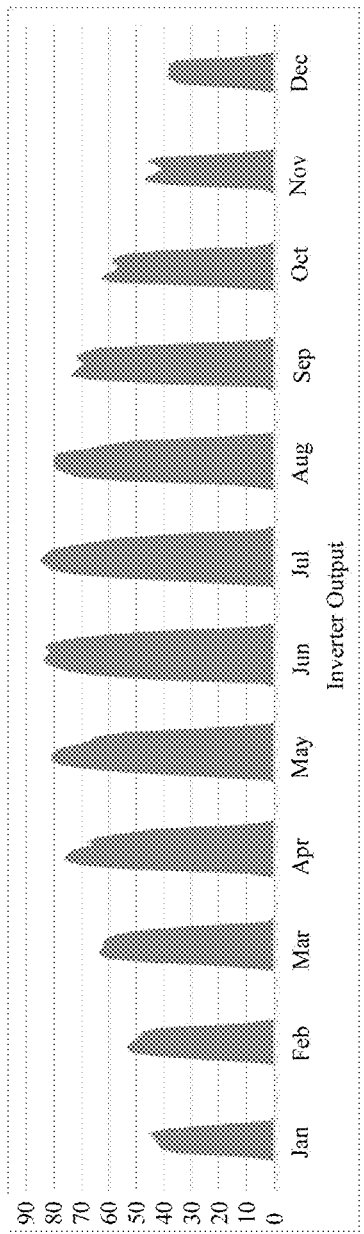
FIG. 3A shows a mean power generation in a 24-hour day in each month from a solar module affected by natural causes of a variability.

FIG. 3A shows a mean power generation in a 24-hour day from a RES affected by natural variability. Data shown is calculated by taking the mean of the RES power generation for each hour for all days in that month. In this example, variability of the power generated by the RES is tied to the duration of daylight and the strength of sunlight each month. Around summer solstice in the Northern Hemisphere (about June 21 of each year), the duration of daylight is longer and the sunlight is more direct. Therefore, the magnitude and the duration of power generated by a RES may be highest near the summer solstice. Around winter solstice in the Northern Hemisphere (about December 21 each year), the duration of daylight is shorter and the sunlight is less direct. Therefore, the magnitude and the duration of power generated may be lowest near the winter solstice. In the example shown in FIG. 3A, the peak magnitude of power generation in June is about 2 times greater than the peak power generation in December. The duration of power generation in June is about 1.5 times greater than the duration of power generation in December. An expected power generation from a RES affected by natural of variability may be referred to as a natural variability power production schedule.

Figure 3B:
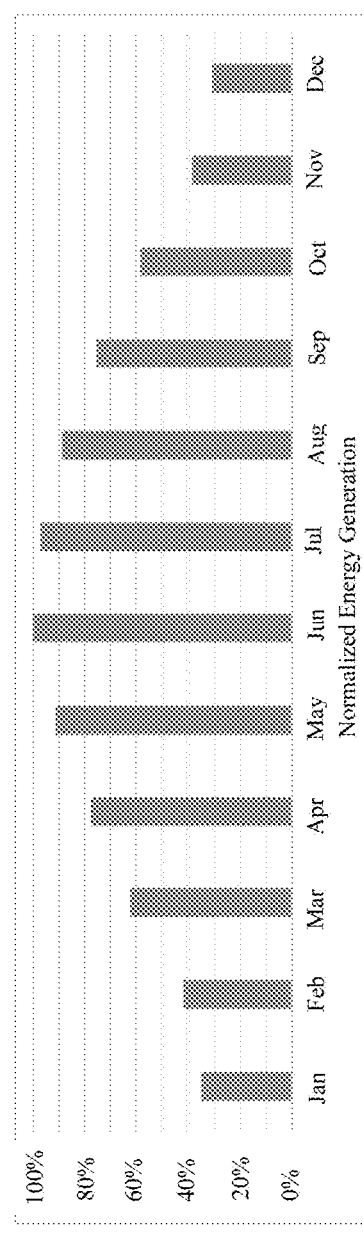
FIG. 3B shows a monthly energy generation of a solar module affected by natural variability.

FIG. 3B shows the monthly energy generation of a RES affected by natural variability. The above-mentioned natural causes of variability on the power generation of a RES each day can accrue over a period of days, weeks, or months, such that the total amount of energy generated in those periods also exhibit variability. As shown in FIG. 3B, the amount of energy generation is highest near the summer solstice and lowest near the winter solstice. In this example, the energy generation by the RES in December is approximately 30% of the energy generation by the RES in June. An expected energy generation from a RES affected by natural variability may be referred to as a natural variability energy production schedule.

Variability of a RES may also be associated with effects other than the duration of daylight and the power of sunlight. Certain regions may experience precipitation (e.g., rainfall) with variability on the order of days, weeks, or months. For example, precipitation in Seoul, South Korea exhibits extreme variability; the amount of precipitation may vary from about 20 millimeters (mm) in January to about 400 mm in July and August. Precipitation and clouds can reduce the power of sunlight reaching solar modules, thus decreasing RES power generation. Precipitation may also reduce the efficiency of solar modules by collecting on surfaces of solar modules.

Variability of a RES may be associated with servicing frequencies. In some cases, solar modules of a solar RES may periodically be serviced by cleaning and/or maintenance (e.g., removing debris and/or washing). Servicing solar modules of a RES can increase the power generation of the RES. If the RES is serviced in a predictable pattern (e.g., every 1 month, 2 months, 3 months, or 6 months), the effects of servicing may add variability to the RES power generation.

Variability of a RES may be associated with wind patterns. In New England areas of the USA, wind energy generation can be the highest during the winter months, near January and February. Meanwhile, wind energy can be the lowest during the summer months, near June and July. In California, USA, the opposite can be true; wind energy generation can be the lowest during the winter months, and be the highest during the summer months.

Variability of a RES may be associated with various natural causes (e.g., weather, climate, and/or the seasons) and human-driven factors (e.g., solar modules servicing).

Variability of a RES may comprise one or more patterns of various timescales. In some cases, variability may comprise a pattern having a timescale of 1 calendar year. In some cases, variability may comprise a pattern having a timescale of 6 months. In some cases, variability may comprise a pattern having a timescale of 4 months. In some cases, variability may comprise a pattern having a timescale of 3 months. In some cases, variability may comprise a pattern having a timescale of 2 months. In some cases, variability may comprise a pattern having a timescale of 1 month. In some cases, variability may comprise a pattern having a timescale of 1 week. In some cases, variability may comprise a pattern having a timescale of 1 day.

In some cases, energy or power demand of a grid may have variability. In some cases, energy or power demand from the grid can be highest during the summer months. In some cases, electrical energy or power demand from a grid can be highest in winter. In some cases, energy or power demand from the grid may vary depending on the day of the week. In some cases, energy or power demand from the grid may be higher during the weekdays and lower during the weekends. In some cases, energy or power demand from the grid may be lower during the weekdays and higher during the weekends.

Variability of energy or power delivery may be tuned to have a pattern with various durations for a timestep. In some cases, the duration of a timestep may be a month. In some cases, the duration for a timestep may be at least about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year. In some cases, the duration for a timestep may be at most about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year.

Variability of energy or power delivery may be tuned to have a pattern that repeats after various durations of time. In some cases, the pattern may repeat each year. In some cases, the pattern may repeat each month. In some cases, the pattern may repeat after at least about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year. In some cases, the pattern may repeat after at most about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year.

Variability of energy or power delivery may be tuned to have any pattern. In some cases, the pattern may depend on the destination of energy or power delivery, expected energy demand of the destination of energy or power delivery, historical energy or power demand of the destination of energy or power delivery, energy or power generated by a RES, geography of the destination, weather of the destination, climate of the destination, culture of people living in the destination, or any combination thereof.

In some cases, the pattern may have higher variance (i.e. the square of standard deviation) relative to the pattern of energy or power generated by a RES. In some cases, the pattern may have lower variance (i.e. the square of standard deviation) relative to the pattern of energy or power generated by a RES. In some cases, the pattern may be an amplified pattern of the energy or power generated by a RES. In some cases, the pattern may be a dampened pattern of the energy or power generated by a RES. In some cases, the degree of amplifying or dampening may be quantified as a ratio of the maximum and the minimum value in a pattern of the energy or power generated by the RES.

In some cases, the pattern may match the expected energy or power demand of the destination of energy or power delivery. In some cases, the pattern may be substantially consistent between each time step. In some cases, the pattern may substantially vary between each time step. In some cases, variability of energy or power delivery may have less noise compared to variability of energy or power generated by a RES. "Noise", as used herein, can refer to unpredictable variability in data. In some cases, variability of energy or power delivery may exhibit noise as unpredictable variability in the short-term. In some cases, variability of energy or power delivery may have less volatility compared to variability of energy or power generated by a RES. "Volatility", as used herein, can refer to sudden and/or unexpected changes in data.

Variability of energy or power delivery may be tuned to have a pattern only for a certain duration of time in each year. In some cases, the pattern may be provided for 1 month each year. In some cases, the pattern may be provided for 3 months each year. In some cases, the pattern may be provided for 6 months each year. In some cases, the pattern may be provided for 12 months each year.

ESS

An ESS can refer to a system configured to store energy. In some cases, the ESS may be in electrical communication with a RES. In some cases, an ESS may be in electrical communication with a grid. In some cases, the ESS may be in electrical communication with an auxiliary process.

In some cases, an ESS may be a rechargeable battery ESS. In some cases, an ESS may be a pumped hydroelectric system. In some cases, an ESS may be a flow battery ESS. In some cases, an ESS may be a capacitive ESS. In some cases, an ESS may be a flywheel ESS. In some cases, an ESS may be a compressed air ESS. In some cases, an ESS may be a liquified air ESS. In some cases, an ESS may be a hydrogen ESS. In some cases, an ESS may be a gravity ESS.

In some cases, the ESS may be used to tune the variability of energy or power delivered to a grid, an auxiliary process, or both.

In some cases, the ESS may be used to tune the variability of power delivered to a grid such that the duration of time that power is delivered to the grid is lengthened. In some cases, the ESS may be used to tune the variability of power delivered to a grid such that the duration of time that power is delivered to the grid is shortened. In some cases, the ESS may be used to tune the variability of power delivered to an auxiliary process such that the duration of time that power is delivered to the auxiliary process is lengthened. In some cases, the ESS may be used to tune the variability of power delivered to an auxiliary process such that the duration of time that power is delivered to the auxiliary process is shortened.

In some cases, the ESS may be cycled in short durations (e.g., daily). In some cases, the ESS may be not cycled over long durations (e.g., week, months, or a year). In some cases, the ESS may not be cycled in short durations (e.g., daily). In some cases, the ESS may be cycled over long durations (e.g., week, months, or a year).

In some cases, an ESS could be used to further modify variability in energy delivered to the auxiliary process in a day. In some cases, an ESS could be used to further modify variability in power delivered to the auxiliary process in a day. In some cases, an ESS could be used to further modify variability in energy delivered to the grid in a day. In some cases, an ESS may be used to further modify variability in power delivered to the grid in a day. In some cases, an ESS may be used to modify a daily pattern of the amount of energy delivered to an electrical grid. In some cases, an ESS may be used to modify a daily pattern of the amount of energy delivered to an energy-consuming load.

In some cases, the pattern of energy delivered to the grid may further be modified by being partially delivered to the grid immediately, and partially stored in an ESS for delivery to the grid at a later time. In some cases, the pattern of energy delivered to the auxiliary load may be partially used in the load and partially stored in an ESS for delivery to that load at a later time.

In some embodiments the ESS may receive an amount of power from the RES based on a second power receiving threshold. For example, a first amount of power based on the first power receiving threshold may be directed from the RES to the auxiliary process and a second amount of power may be directed to the electrical grid. The second amount of power may be power generated by the RES in excess of the first power receiving threshold. The second amount of power may be limited by the second power receiving threshold. A third amount of power representing power produced by the RES in excess of the second power receiving threshold may be directed to the ESS.

In some embodiments the ESS may direct an amount of power to the electrical grid and/or the auxiliary process. For example, the auxiliary process may have a power receiving threshold. If the power delivered from the RES to the auxiliary process is less than the power receiving threshold, the ESS may direct an amount of power to the auxiliary process such that the power delivered to the auxiliary process from the RES and the ESS equals the power receiving threshold.

Methods For Tuning Variability

In some aspects, the present disclosure describes a method of adjusting energy delivered by a RES to a plurality of loads comprising an electrical grid and one or more energy-consuming loads. In some embodiments, energy may be delivered from the RES to the plurality of loads using one or more inverters.

In some cases, the method may comprise determining a natural variability energy production schedule of the RES. As described herein, the natural variability energy production schedule of the RES may comprise one or more recurrent patterns with a timescale that is less than or equal to a year. As described herein, the natural variability energy production of the RES may be associated with various natural causes (e.g., weather, climate, and/or the seasons) and, in some cases, human-driven factors (e.g., solar module servicing).

In some cases, the method may comprise establishing a prioritization order between the electrical grid and the energy-consuming load such that one of the electrical grid or the energy-consuming load has a higher power use priority over the other. In some cases, the higher power use priority can allow the power to be delivered first to the grid or the load that has the higher power use priority.

In some cases, the method comprises setting a power receiving threshold for the electrical grid or the energy-consuming load based on the prioritization order. In some cases, the power receiving threshold (i.e., "power limit") may be a maximum amount of power that may be delivered to the grid or the load that has the higher power use priority.

In some cases, the method comprises adjusting the energy delivered by the RES by controlling a first amount of energy delivered to the electrical grid and a second amount of energy delivered to the energy-consuming load. In some cases, controlling the first amount and the second amount of energy allows tuning variability of energy delivered to the grid or the load. In some cases, a variability schedule of at least one of the first amount of energy or the second amount of energy is modified over a time period relative to the natural variability energy production schedule of the RES based at least in part on (i) the prioritization order and (ii) the power receiving threshold.

In some cases, the power receiving threshold may be set for the energy-consuming load if the energy-consuming load has the higher power use priority over the electrical grid. In some cases, the energy delivered to the electrical grid may comprise energy generated by the RES in excess of the power receiving threshold that is set for the energy-consuming load. In some cases, there may be no excess of the power receiving threshold for at least a part of the time period. In some cases, there may be excess of the power receiving threshold for all of the time period. In some cases, the energy may be delivered to the energy-consuming load before the energy is delivered to the electrical grid in a duration within the time period.

In some cases, variance in the variability schedule of the energy delivered to the electrical grid may be increased relative to the natural variability energy production schedule of the RES. In some cases, variance in the variability schedule of the energy delivered to the electrical grid may be decreased relative to the natural variability energy production schedule of the RES. In some cases, the increase or decrease may be based at least on the power receiving threshold set for the energy-consuming load. In some cases, the increase or decrease may vary with the power receiving threshold being set for the energy-consuming load. In some cases, the increase may be less when a lower power receiving threshold is set for the energy-consuming load compared to a higher power receiving threshold. In some cases, the increase may be greater when a higher power receiving threshold is set for the energy-consuming load compared to a lower power receiving threshold.

In some cases, the variance in the variability schedule of the energy delivered to the electrical grid may be increased by at least about 0, 1, 2, 3, 4, 5, 6, 7, 8, 9, 10, 20, 30, 40, 50, 60, 70, 80, 90, 91, 92, 93, 94, 95, 96, 97, 98, 99, 100, 150, 200, 250, 300, 450, 500, 600, 700, 800, 900, or 1000 percent. In some cases, the variance in the variability schedule of the energy delivered to the auxiliary process may be increased by at most about 0, 1, 2, 3, 4, 5, 6, 7, 8, 9, 10, 20, 30, 40, 50, 60, 70, 80, 90, 91, 92, 93, 94, 95, 96, 97, 98, 99, 100, 150, 200, 250, 300, 450, 500, 600, 700, 800, 900, or 1000 percent. In some cases, the variance in the variability schedule of the energy delivered to the electrical grid may be increased by at least about 1, 2, 3, 4, 5, 6, 7, 8, 9, or 10 magnitudes. In some cases, the variance in the variability schedule of the energy delivered to the auxiliary process may be increased by at most about 1, 2, 3, 4, 5, 6, 7, 8, 9, or 10 magnitudes.

In some cases, the variance in the variability schedule of the energy delivered to the electrical grid may be decreased by at least about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent. In some cases, the variance in the variability schedule of the energy delivered to the auxiliary process may be decreased by at most about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent. In some cases, the variance in the variability schedule of the energy delivered to the electrical grid may be decreased by at least about 1, 2, 3, 4, 5, 6, 7, 8, 9, or 10 magnitudes. In some cases, the variance in the variability schedule of the energy delivered to the auxiliary process may be decreased by at most about 1, 2, 3, 4, 5, 6, 7, 8, 9, or 10 magnitudes.

In some cases, the variability schedule of the energy delivered to the electrical grid may be tunable such that the variability schedule of the energy delivered to the electrical grid has a similar profile to the natural variability energy production schedule of the RES. In some cases, the variability schedule of the energy delivered to the electrical grid may be tunable such that the energy delivered to the electrical grid is substantially zero during one or more durations within the time period.

In some cases, a duration within the time period may be at least about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year. In some cases, a duration within the time period may be at most about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year.

In some cases, the power receiving threshold may be set for the electrical grid if the electrical grid has the higher power use priority over the energy-consuming load.

In some cases, the variance of the variability schedule of the energy delivered to the energy-consuming load may be larger when a higher power receiving threshold is set for the energy-consuming load compared to a lower power receiving threshold. In some cases, the variance of the variability schedule of the energy delivered to the energy-consuming load may be smaller when a lower power receiving threshold is set for the energy-consuming load compared to a higher power receiving threshold.

In some cases, the variability schedule of the energy delivered to the energy-consuming load may have a different shape profile than the natural variability energy production schedule of the RES. In some cases, the different shape profile may be amplified. In some cases, the different shape profile may be dampened. In some cases, the different shape profile may be shifted in phase. In some cases, the different shape profile may comprise a higher frequency pattern. In some cases, the different shape profile may comprise a lower frequency pattern. In some cases, the different shape profile may lack a certain frequency of a pattern.

In some cases, the variability schedule of the energy delivered to the energy-consuming load may have a substantially flat profile. In some cases, the variability schedule of the energy delivered to the energy-consuming load may have a substantially non-flat profile. "Flatness" or "non-flatness" may be quantified by calculating a ratio between (i) a maximum power or energy delivery in a time period to the (ii) minimum power or energy delivery in the time period. In some cases, a profile may be considered flat when the ratio is between about 0.8, 0.85, 0.9, 0.95, 1, 1.05, 1.1, 1.15, or 1.2. In some cases, a profile may be considered non-flat when the ratio is less than about 0.8 or greater than about 1.2.

In some cases, the energy delivered to the energy-consuming load may comprise energy generated by the RES in excess of the power receiving threshold that is set for the electrical grid. In some cases, the energy may be delivered to the electrical grid before the energy is delivered to the energy-consuming load in a duration within the time period.

In some cases, the variance of the variability schedule of the energy delivered to the energy-consuming load may be increased relative to the natural variability energy production schedule of the RES.

In some cases, the variance of the variability schedule of the energy delivered to the energy-consuming load may be increased by at least about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent. In some cases, the variance of the variability schedule of the energy delivered to the energy-consuming load may be increased by at most about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent.

In some cases, the variance of the variability schedule of the energy delivered to the electrical grid may be decreased relative to the natural variability energy production schedule of the RES.

In some cases, the variance of the variability schedule of the energy delivered to the energy-consuming load may be decreased by at least about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent. In some cases, the variance of the variability schedule of the energy delivered to the energy-consuming load may be decreased by at most about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent.

In some cases, the increase or the decrease in the variance of the variability schedule of the energy delivered to the energy-consuming load may be based at least on the power receiving threshold set for the electrical grid. In some cases, the increase or the decrease in the variance of the variability schedule of the energy delivered to the energy-consuming load may vary with the power receiving threshold being set for the electrical grid. In some cases, a change in the variance of the variability schedule of the energy may be less when a lower power receiving threshold is set for the electrical grid compared to a higher power receiving threshold. In some cases, the variance of the variability schedule of the energy may be greater when a higher power receiving threshold is set for the electrical grid compared to a lower power receiving threshold. In some cases, the variance of the variability schedule of the energy delivered to the energy-consuming load may be tunable such that the variability schedule of the energy delivered to the energy-consuming load has a similar profile to the natural variability energy production schedule of the RES. In some cases, the variance of the variability schedule of the energy delivered to the energy-consuming load may be tunable such that the energy delivered to the energy-consuming load is substantially zero during one or more durations within the time period.

In some cases, the variance of the variability schedule of the energy delivered to the electrical grid may be higher when a higher power receiving threshold is set for the electrical grid compared to a lower power receiving threshold. In some cases, the variance of the variability schedule of the energy delivered to the electrical grid may be lower when a lower power receiving threshold is set for the electrical grid compared to a higher power receiving threshold. In some cases, the variability schedule of the energy delivered to the electrical grid may have a different shape profile than the natural variability energy production schedule of the RES. In some cases, the variability schedule of the energy delivered to the electrical grid may have a substantially flat profile.

In some cases, the power receiving threshold may be a fixed percentage or ratio of a maximum power output of the RES throughout a time period. In some cases, the fixed percentage of ratio may be at least about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent. In some cases, the fixed percentage of ratio may be at most about 0, 1, 2, 3, 4, 5, 6, 7, 8, 9, 10, 20, 30, 40, 50, 60, 70, 80, 90, 91, 92, 93, 94, 95, 96, 97, 98, 99, or 100 percent. In some cases, the time period may be at least about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year. In some cases, the time period may be at most about a minute, 5 minutes, 10 minutes, 15 minutes, 30 minutes, 1 hour, 2 hours, 3 hours, 4 hours, 6 hours, 8 hours, 12 hours, 1 day, 2 days, 3 days, 4 days, 5 days, 6 days, 1 week, 2 weeks, 3 weeks, 4 weeks, 1 month, 2 months, 3 months, 4 months, 6 months, or 1 year.

Auxiliary-First Rule

The following example describes a method for tuning a variability schedule of energy delivered to the auxiliary process (i.e., the energy-consuming load) and the grid by setting a prioritization order for energy delivery to the auxiliary process versus the grid. The method may comprise setting a power delivery limit (i.e., a power receiving threshold) to the auxiliary process. In some cases, the method may dampen the variability of energy delivered, relative to a natural variability of RES energy generation, to the auxiliary process. In some cases, the method may amplify the variability of energy delivered, relative to a natural variability of RES energy generation, to the grid. In some cases, the method may reduce certain signal characteristics of power/energy generated by the RES (e.g., high-frequency noise, volatility, etc.) as delivered to the auxiliary process.

By way of example, the following paragraphs describe a solar DURES comprising an electrolyzer for generating hydrogen. Those skilled the art will recognize that various other auxiliary processes may also be used in place of hydrogen generation using an electrolyzer.

Low Auxiliary Power Limit

When power is generated by a solar DURES, power is first delivered to the electrolyzer up to a power delivery limit (i.e., "auxiliary power limit") to produce hydrogen. Only excess power above the power delivery limit is delivered to the grid.

Figure 4A:
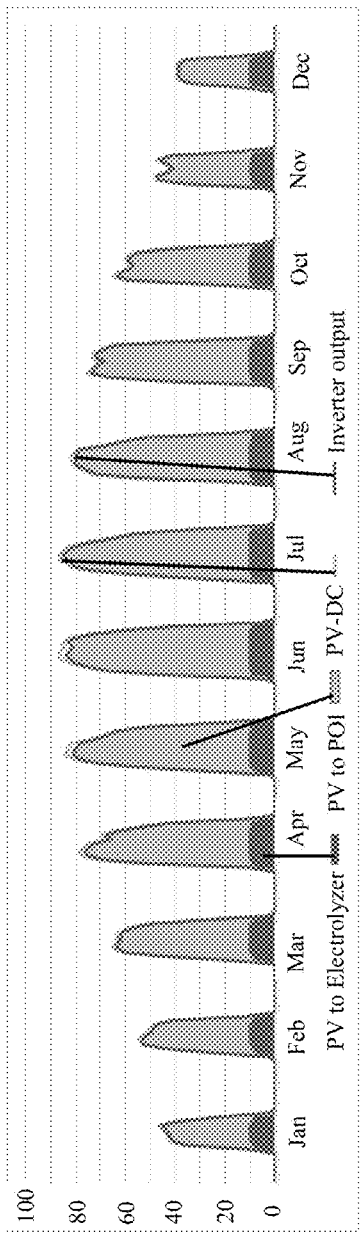
FIG. 4A shows a mean power generation and delivery in a 24-hour day in each month from a DURES implementing an auxiliary-first rule with relatively low auxiliary power limit, in accordance with some embodiments.

FIG. 4A shows a mean power generation and delivery in a 24-hour day from a solar DURES implementing an auxiliary-first rule with relatively low auxiliary power limit, in accordance with some embodiments. If the auxiliary power limit is set low relative to the maximum potential power generation of the solar DURES, then the power generation of the solar DURES may reach the auxiliary power limit early each morning. After reaching the auxiliary power limit, the solar DURES may continue to deliver power at the auxiliary power limit to the electrolyzer throughout the day until shortly before sunset, when the solar RES power generation dips below the auxiliary power limit. As a result, the electrolyzer may receive a steady flow of power throughout the day, with little or no variability due to, for example, the passage of clouds over parts of the solar array. In addition, the power delivered to the electrolyzer may be the same on most days throughout the year.

Figure 4B:
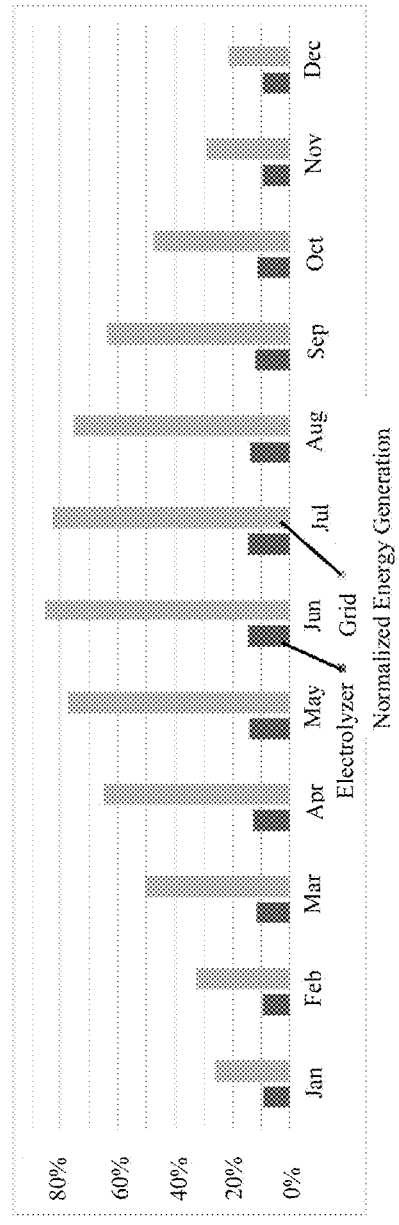
FIG. 4B shows a monthly energy generation and delivery of a DURES implementing an auxiliary-first rule with relatively low auxiliary power limit, in accordance with some embodiments.

FIG. 4B shows the monthly energy generation and delivery of a solar DURES implementing an auxiliary-first rule with relatively low auxiliary power limit, in accordance with some embodiments. In each month of the year, the variability of energy delivered to the electrolyzer is dampened because, although shorter winter days deliver less daily energy than longer summer days, the electrolyzer is insulated from the variability in peak power output of the RES between summer and winter. In contrast, the variability of energy delivered to the grid is similar to the variability of energy generated by the solar DURES.

As a result, the power/energy delivered to the grid may have a variability substantially similar to that of the solar DURES power/energy generation variability. In a hypothetical limiting case when the auxiliary power limit approaches zero, the variability of energy and power delivered to the grid may approach the variability of energy and power generated by the solar DURES.

High Auxiliary Power Limit

When power is produced by the solar DURES, power is first delivered to the electrolyzer up to a power delivery limit (i.e., "auxiliary power limit") to produce hydrogen. Only excess power above the power delivery limit is delivered to the grid.

Figure 5A:
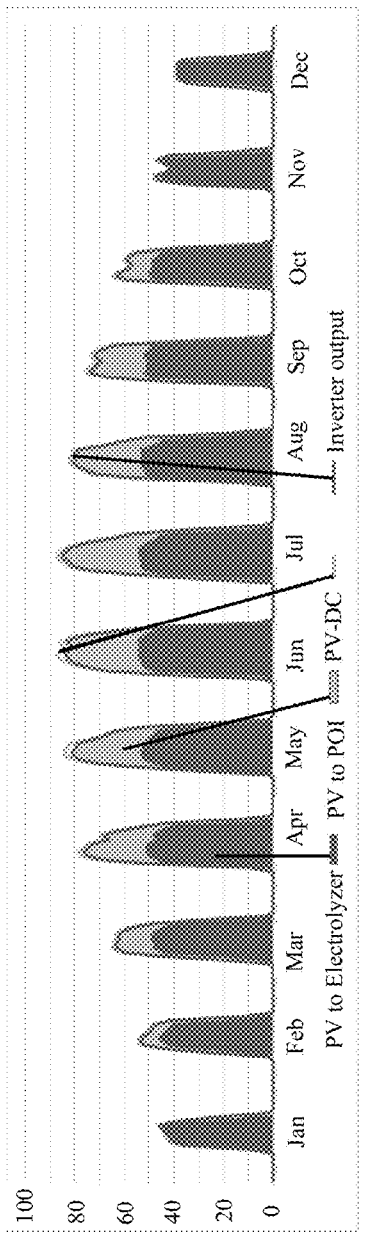
FIG. 5A shows a mean power generation and delivery in a 24-hour day in each month from a DURES implementing an auxiliary-first rule with relatively high auxiliary power limit, in accordance with some embodiments.

FIG. 5A shows a mean power generation and delivery in a 24-hour day in each month from a solar DURES implementing an auxiliary-first rule with relatively high auxiliary power limit, in accordance with some embodiments. In this example, the auxiliary power limit is set equal to the maximum daily power generation expected from the solar DURES around Spring Equinox. Therefore, when the power generation by the solar DURES is lower than the auxiliary power limit (e.g., during the winter months), energy will solely be delivered to the electrolyzer. When the power generation of the solar DURES is higher than the auxiliary power limit (e.g., during the summer months), energy will be delivered at the auxiliary power limit to the electrolyzer and excess energy will be delivered to the grid.

Figure 5B:
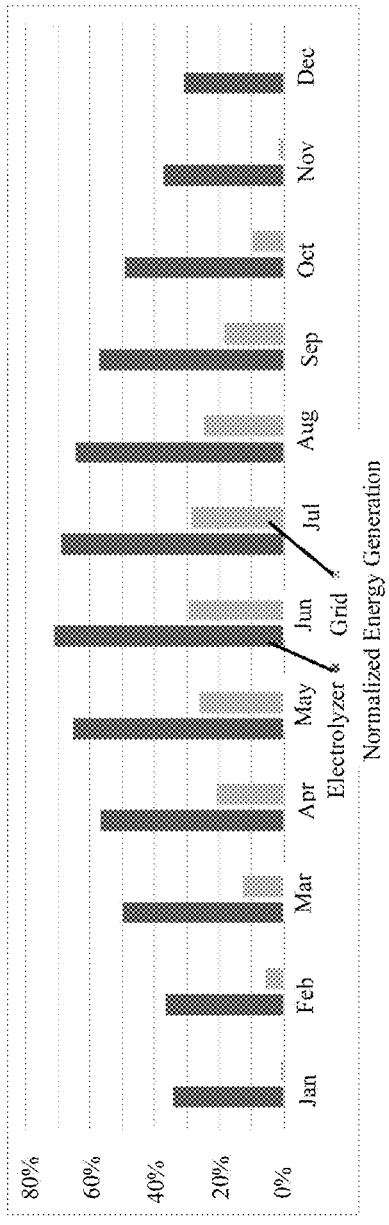
FIG. 5B shows a monthly energy generation and delivery of a DURES implementing an auxiliary-first rule with relatively high auxiliary power limit, in accordance with some embodiments.

FIG. 5B shows the monthly energy generation and delivery of a solar DURES implementing an auxiliary-first rule with a relatively high auxiliary power limit, in accordance with some embodiments. The variability of energy delivered to the electrolyzer is reduced compared to the variability of the solar DURES energy generation. The energy delivered to the electrolyzer in December is approximately 44% of the energy delivered to the electrolyzer in June, compared to the ratio of solar DURES energy generation between December and June of 30%. Energy delivered to the grid during winter months is very low (e.g., zero in December) compared to the energy delivered during the summer months. Energy delivered to the grid shows variability that is exaggerated, or amplified, relative to the variability of the solar DURES energy generation.

When delivering electricity, amplifying the variability of the solar DURES energy or power generation may be useful in regions where the variability of energy or power demand is more extreme than the variability of energy or power generated by the solar DURES. For example, a desert region may have access to baseload power (e.g., nuclear power) capable of supplying most winter electricity demands, however, the baseload power may be deficient for delivering air conditioning loads during hot summer months. Additional energy demands during the summer may require a powerplant to deliver increasing amounts of energy from Spring to mid-Summer, and declining amounts from mid-Summer to Fall. In other words, having variability more extreme than the variability of the solar DURES power or energy generation may be demanded by the grid.

In some cases, the auxiliary power limit may be increased to increase the portion of a year when no energy is delivered to the grid. In some cases, the auxiliary power limit may be decreased to decrease the portion of the year when no energy is delivered to the grid.

In some cases, the auxiliary power limit may be increased to amplify the variability of the energy delivered to the grid, compared to the variability of the energy generated by the solar RES.

In some cases, when the auxiliary power limit is close to the peak power generation of the solar DURES, little energy will be delivered to the grid, and the variability of power/energy delivery to the auxiliary process will be close to the variability of the solar DURES power/energy generation.

In some cases, when the auxiliary power limit is larger than the peak power generation of the solar DURES, no energy will be delivered to the grid, and the variability of power/energy delivery to the auxiliary process will be equal to the variability of the solar DURES power/energy generation.

In some cases, the auxiliary power limit may be varied to vary the relative amounts of annual energy delivered to the auxiliary process and to the grid. In some cases, a low auxiliary power limit will result in a "flatter" variability for energy delivered to the auxiliary process, and variability for energy delivered to the grid that is similar to the variability of the solar DURES energy generation. In some cases, a high auxiliary power limit will increase the variability of energy delivered to the auxiliary process and amplify the variability of the energy delivered to the grid, and will allocate more annual energy to the auxiliary process relative to grid use.

Grid-First Rule

The following example describes a method for tuning a variability of energy delivered to the auxiliary process (i.e., the energy-consuming load) and the grid by setting a prioritization order for energy delivery to the grid versus the auxiliary process. In some cases, the auxiliary process may comprise an energy-consuming load. The method may comprise setting a power delivery limit (i.e., a power receiving threshold) to the grid. In some cases, the method may dampen the variability of energy delivered, relative to a natural variability of RES energy generation or to the grid. In some cases, the method may amplify the variability of energy delivered, relative to a natural variability of RES energy generation, to the auxiliary process. In some cases, the method may reduce certain signal characteristics of power/energy generated by the RES (e.g., high-frequency noise, volatility, etc.) as delivered to the grid.

By way of example, the following paragraphs describe a solar DURES comprising an electrolyzer for generating hydrogen. Those skilled the art will recognize that various other auxiliary processes may also be used in place of hydrogen generation using an electrolyzer.

Low Grid Power Limit

When power is generated by the solar DURES, power is first delivered to the grid up to the power delivery limit (i.e., "grid power limit"). Only excess power above that power delivery limit is delivered to the electrolyzer.

Figure 6A:
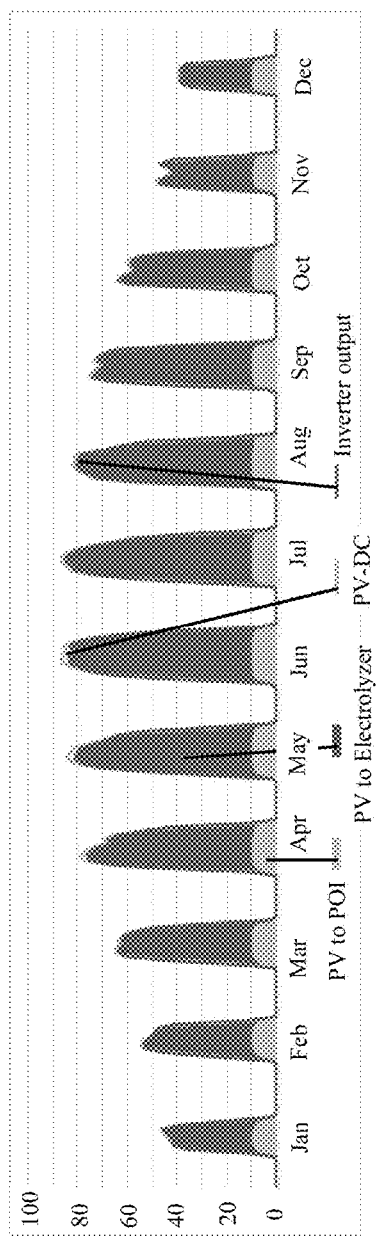
FIG. 6A shows a mean power generation and delivery in a 24-hour day in each month from a DURES implementing a grid-first rule with relatively low grid power limit, in accordance with some embodiments.

FIG. 6A shows a mean power generation and delivery in a 24-hour day from a solar DURES implementing a grid-first rule with a relatively low grid power limit, in accordance with some embodiments. When power is produced by the solar DURES, all power up to the grid power limit is delivered first to the grid. Only excess power above the grid power limit is delivered to the electrolyzer. As a result, the grid may receive a steady flow of power throughout the day, with little or no variability due to, for example, the passage of clouds over parts of the solar array. In addition, the power delivered to the grid may be the same on most days throughout the year. In contrast, the variability of energy delivered to the auxiliary load is similar to the variability of energy generated by the solar DURES. In a hypothetical limit where the grid power limit approaches zero, the variability of power delivered to the grid will be significantly dampened compared to the variability of power generated by the solar DURES, while the variability of power delivered to the auxiliary load will approach the variability of power generated by the solar DURES.

Figure 6B:
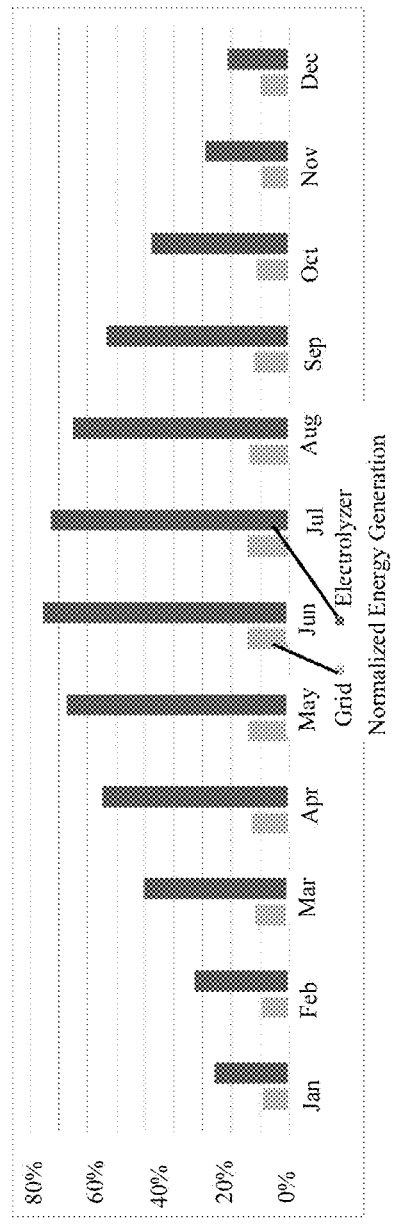
FIG. 6B shows a monthly energy generation and delivery of a DURES implementing a grid-first rule with relatively low grid power limit, in accordance with some embodiments.

FIG. 6B shows the monthly energy generation and delivery of a solar DURES implementing a grid-first rule with a relatively low grid power limit, in accordance with some embodiments. The variability of the energy delivered to the grid is reduced relative to the variability of the solar DURES energy generation because, although shorter winter days deliver less daily energy than longer summer days, the power delivered to the grid is not affected by the variability in peak power output of the RES between summer and winter. In this example, the energy delivered to the grid in December is 60% of the energy delivered to the grid in June (as compared to 30% for the ratio between energy generated by the solar DURES in December versus June).

The variability of the energy delivered to the electrolyzer is slightly amplified than the variability of the solar DURES energy generation. The energy delivered to the electrolyzer in December is approximately 25% of the energy delivered in June (as compared to 30% for the ratio between energy generated by the solar DURES in December versus June).

High Grid Power Limit

When power is generated by the solar DURES, power is first delivered to the grid up to the power delivery limit (i.e., "grid power limit"). Only excess power above that limit is delivered to the electrolyzer.

Figure 7A:
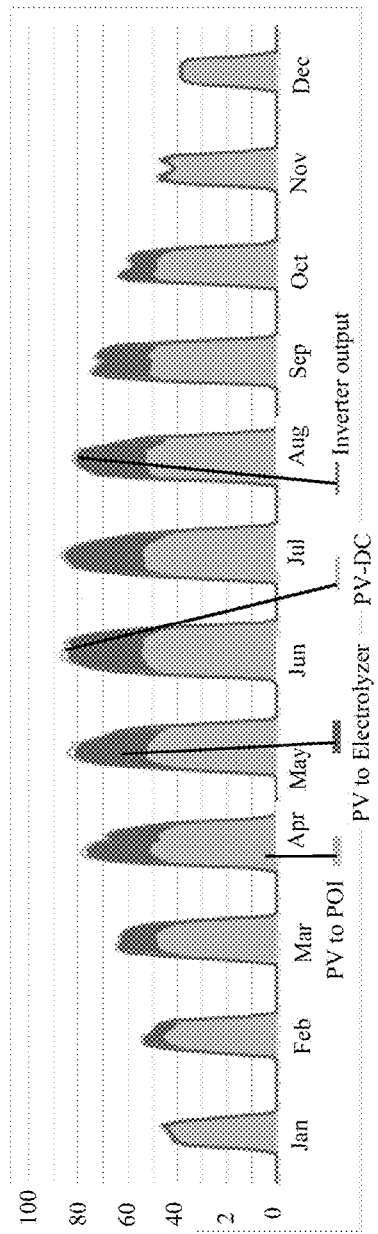
FIG. 7A shows a mean power generation and delivery in a 24-hour day in each month from a DURES implementing a grid-first rule with relatively high grid power limit, in accordance with some embodiments.

FIG. 7A shows a mean power generation and delivery in a 24-hour day in each month from a solar DURES implementing a grid-first rule with a relatively high grid power limit, in accordance with some embodiments. If the grid power limit is set equal to the maximum daily power generation expected from the solar DURES around Spring Equinox, then during the winter months all energy generated by the solar DURES will be delivered to the grid and no energy will be delivered to the electrolyzer. In the period after the Spring Equinox and before the Fall Equinox, some energy will be delivered to the electrolyzer, wherein the most energy will be delivered during mid-summer. This variability of energy delivered to the electrolyzer is amplified relative to the variability of energy generation by the solar DURES. This implementation may be useful in regions where the variability of energy demand from the grid is weaker than the variability of energy generated by the solar DURES. The hydrogen produced by the electrolyzer may be used as seasonal energy storage; the hydrogen can be used to create electrical power in periods of low power generation by the solar DURES (e.g., winter).

Figure 7B:
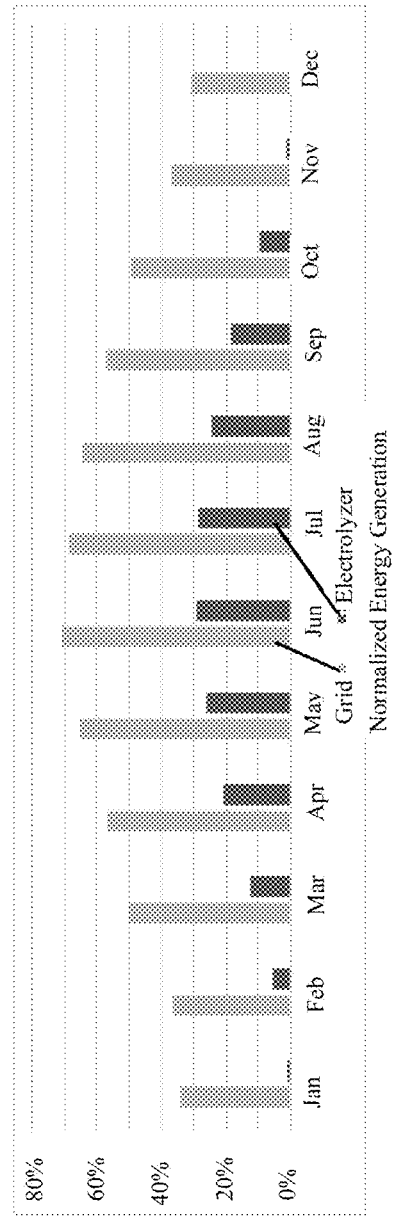
FIG. 7B shows a monthly energy generation and delivery of a DURES implementing a grid-first rule with relatively high grid power limit, in accordance with some embodiments.

FIG. 7B shows the monthly energy generation and delivery of a solar DURES implementing a grid-first rule with a relatively high grid power limit, in accordance with some embodiments. The variability of the energy delivered to the grid is dampened with respect to the variability of the solar DURES energy generation. In this example, the energy delivered to the grid in December is 44% of the amount in June (as compared to 30% for the ratio of energy generation by the solar DURES in December versus June). The variability of the energy delivered to the electrolyzer each month is higher than the natural variability of the energy generation by the solar DURES.

In some cases, the grid power limit may be increased to broaden the portion of the year when no energy is delivered to the electrolyzer. As a result, variability of power delivered to the electrolyzer may be amplified. In some cases, the grid power limit may be decreased to narrow the portion of the year when no energy is delivered to the electrolyzer. As a result, variability of power delivered to the electrolyzer may be dampened.

In a hypothetical limit where the grid power limit approaches the peak power generation of the solar DURES, very little energy will be delivered to the electrolyzer, and the variability of energy delivered to the grid will approach the variability of the solar DURES energy generation.

The grid power limit may be varied to vary the relative amounts of annual energy delivered to the electrolyzer versus the grid. A low grid power limit may lead to a dampened variability for the energy delivered to the grid relative to the solar DURES energy generation variability. A low grid power limit may lead to a variability for the energy delivered to the electrolyzer that is close to the solar DURES energy generation variability. As a result, more energy will be delivered to the electrolyzer compared to the grid. Conversely, a high grid power limit may increase the variability of energy delivered to the electrolyzer and decrease the variability of the energy delivered to the grid. As a result, more energy may be delivered to the grid and less to the electrolyzer.

Rules With Variable Power Limits

In some cases, power delivery limits (i.e., the auxiliary power limit or the grid power limit) are fixed values for maximum power that may be delivered to the grid or the auxiliary process. Therefore, when power limits are fixed, the variability of either energy delivery (i.e., energy delivered to the grid or delivered to the auxiliary process) may not be tuned as desired (for example, may not be completely eliminated because the lengths of days may vary throughout a year).

Therefore, tuning variability with fixed power delivery limits may have some constraints in the range of variabilities for power or energy delivery that may be created. To achieve very low variability using fixed power delivery limits, the maximum power generation of a RES must be very large compared to the applicable power delivery limit, which may not be economically attractive. Increasing variability using fixed power delivery limits may be restrictive in certain aspects, for example, a scenario may arise when there is no energy delivered to the grid for several months of the winter. With fixed power limits, it may not be possible to tune the variability in a scalable manner, for example, such that daily energy delivered to the grid in the summer is an arbitrary multiple of daily energy delivered to the grid in winter.

In some aspects, the present disclosure describes a method of adjusting energy delivered by a RES to an electrical grid and an energy-consuming load, wherein the method comprises setting a variable power receiving threshold (i.e., variable power delivery limit) for the electrical grid or the energy-consuming load, wherein the variable power receiving threshold is a variable power level, or a variable percentage or ratio of a maximum power output of the RES over different durations within the time period.

In some cases, the power receiving threshold may be varied seasonally, monthly, weekly, or daily. In some cases, the power receiving threshold may be varied yearly, every 6 months, every 4 months, every 3 months, every 2 months, 1 month, every week, daily, hourly, every minute, or every second. A variable power delivery limit may be changed after being applied for any duration of time and be operable for any duration of time until the variable power delivery limit is changed once again. In some cases, variable power limits may be used to provide energy delivery to the grid or an auxiliary process, wherein the energy delivery comprises a flexible variability.

In some cases, the power receiving threshold is set for the energy-consuming load if the energy-consuming load has the higher power use priority over the electrical grid, and wherein the power receiving threshold is varied such that the energy delivered to the energy-consuming load is evenly distributed over a plurality of durations within the time period. In some cases, the plurality of durations is on a monthly cycle.

In some cases, the power receiving threshold is set for the electrical grid if the electrical grid has the higher power use priority over the energy-consuming load, and wherein the power receiving threshold is varied such that the energy delivered to the electrical grid is evenly distributed over a plurality of durations within the time period. In some cases, the plurality of durations is on a monthly cycle.

In some cases, the flexible variability may have a variability that is independent from the variability of a RES power or energy generation. In some cases, the flexible variability may have a power or energy generation variability that is dependent on the variability of the RES power or energy generation. In some cases, the flexible variability may be no variability or almost no variability. In some cases, the flexible variability may be no variability or almost no variability in the power delivery. In some cases, the flexible variability may be no variability or almost no variability in the energy delivery.

In some cases, the flexible variability may have a variability that is independent from the variability of a RES power or energy generation for a duration of time. In some cases, the flexible variability may have a variability that is dependent on the variability of the RES power or energy generation for a duration of time. In some cases, the flexible variability may be no variability or almost no variability for a duration of time. In some cases, the flexible variability may be no variability or almost no variability in the power delivery for a duration of time. In some cases, the flexible variability may be no variability or almost no variability in the energy delivery for a duration of time. In some cases, the flexible variability may match the variability of the RES.

In some cases, the duration of time may be at least about 1 microsecond, 1 millisecond, 1 second, 1 minute, 15 minutes, 30 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 1 day, 2 days, 3 days, 4 days, 5 days, 6 days, 1 week, 2 weeks, 3 weeks, 1 month, 2 months, 3 months, 4 months, 5 months, 6 months, 7 months, 8 months, 9 months, 10 months, 11 months, or a year. In some cases, the duration of time may be at most about 1 microsecond, 1 millisecond, 1 second, 1 minute, 15 minutes, 30 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 1 day, 2 days, 3 days, 4 days, 5 days, 6 days, 1 week, 2 weeks, 3 weeks, 1 month, 2 months, 3 months, 4 months, 5 months, 6 months, 7 months, 8 months, 9 months, 10 months, 11 months, or a year.

Auxiliary-First, Variable Auxiliary Power Limit

In some cases, a RES may be in electrical communication with a grid and an auxiliary process. The following example describes a method for tuning the variability of RES energy or power generation by prioritizing energy delivery to the auxiliary process versus the grid. The method may set a power delivery limit to the auxiliary process. The power delivery limit may be variable. By way of example, the following paragraphs describe a solar DURES comprising an electrolyzer for generating hydrogen. Those skilled the art will recognize that various other auxiliary processes may also be used in place of hydrogen generation using an electrolyzer.

Figure 8A:
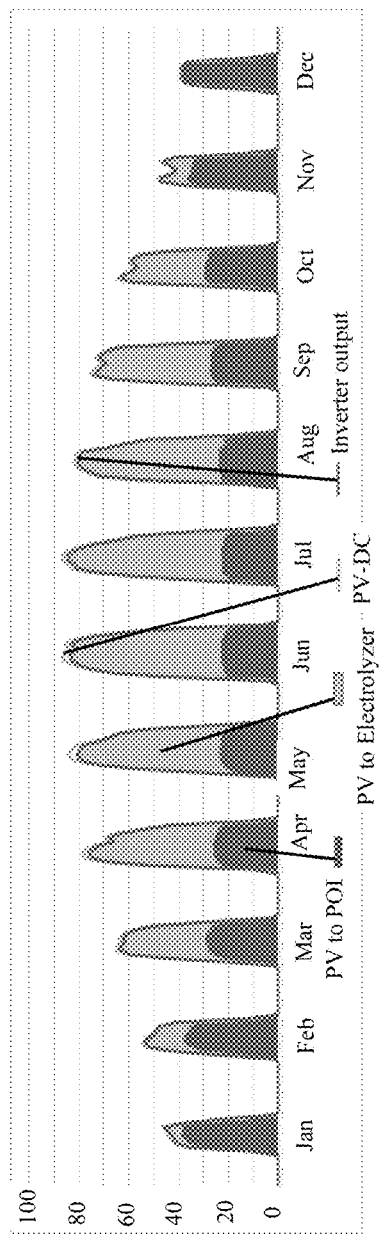
FIG. 8A shows a mean power generation and delivery in a 24-hour day in each month from a DURES implementing an auxiliary-first rule with variable auxiliary power limit, in accordance with some embodiments.

FIG. 8A shows a mean power generation and delivery in a 24-hour day from a solar DURES implementing an auxiliary-first rule with a variable auxiliary power limit, in accordance with some embodiments. Power is sent first to the electrolyzer up to the auxiliary power limit, which is varied from month to month so that the amount of energy delivered to produce hydrogen is consistent between the months. For example, the auxiliary power limit may be set higher during the winter months, and lower during the summer months, so as to offset the effect of the variation in the lengths of the days between summer and winter.

Figure 8B:
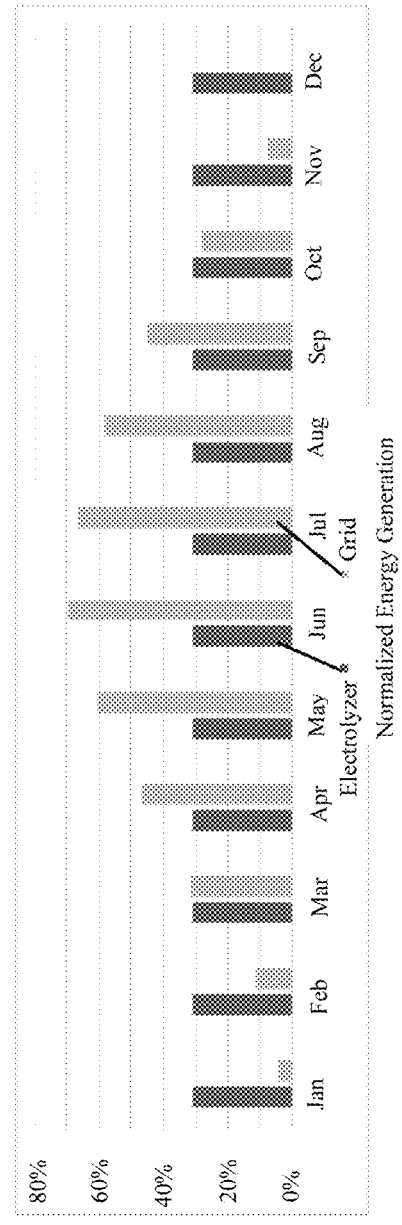
FIG. 8B shows a monthly energy generation and delivery of a DURES implementing an auxiliary-first rule with variable auxiliary power limit, in accordance with some embodiments.

FIG. 8B shows the monthly energy generation and delivery of a solar DURES implementing an auxiliary-first rule with variable auxiliary power limit, in accordance with some embodiments. The energy delivered to the electrolyzer is substantially consistent from month to month, while the variability of the energy delivered to the grid is amplified relative to the variability of the solar DURES energy generation.

In some cases, the variable auxiliary power limit may be set such that it is higher in the winter and lower in the summer, in order to deliver energy to the grid all year round with daily average energy delivered in mid-Summer being a specific multiple of daily average energy delivered in mid-Winter.

In some cases, the variable auxiliary power limit may be set such that it is lower in the winter and higher in the summer, in order to deliver energy to the grid all year round with daily average energy delivered in mid-Winter being a specific multiple of daily average energy delivered in mid-Summer.

Grid-First, Variable Grid Power Limit

In some cases, a RES may be in electrical communication with a grid and an auxiliary process. The following example describes a method for tuning the variability of RES energy generation by prioritizing energy delivery to the grid versus the auxiliary process. The method may set a power delivery limit to the grid. The power delivery limit may be variable. By way of example, the following paragraphs describe a solar DURES comprising an electrolyzer for generating hydrogen. Those skilled the art will recognize that various other auxiliary processes may also be used in place of hydrogen generation using an electrolyzer.

Figure 9A:
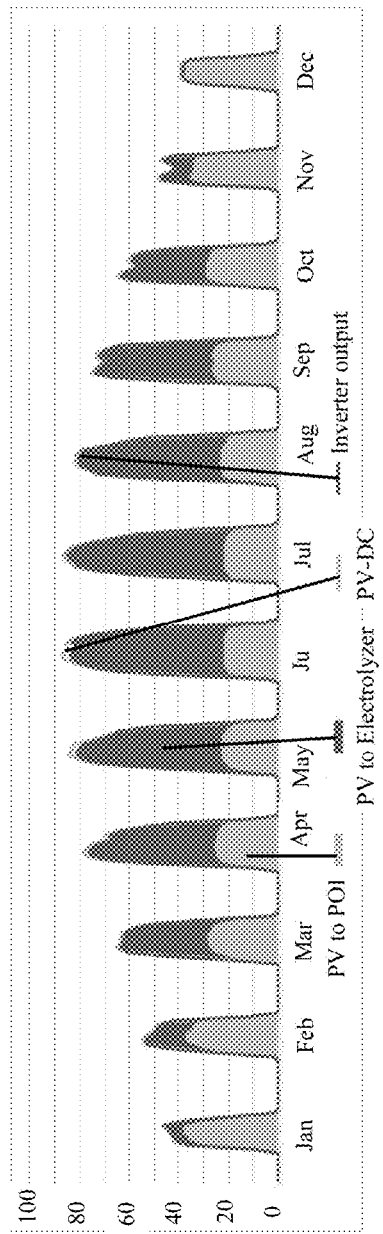
FIG. 9A shows a mean power generation and delivery in a 24-hour day in each month from a DURES implementing a grid-first rule with variable grid power limit, in accordance with some embodiments.
Figure 9B:
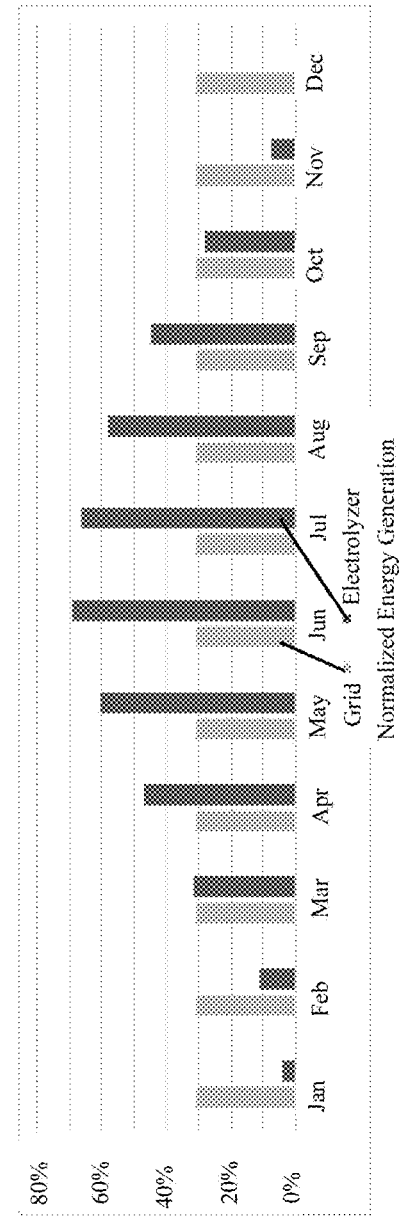
FIG. 9B shows a monthly energy generation and delivery of a DURES implementing a grid-first rule with variable grid power limit, in accordance with some embodiments.

FIG. 9A shows a mean power generation and delivery in a 24-hour day from a solar DURES implementing a grid-first rule with a variable grid power limit, in accordance with some embodiments. FIG. 9B shows the monthly energy generation and delivery of a solar DURES implementing a grid-first rule with a variable grid power limit, in accordance with some embodiments. In some cases, a variable grid power limit may be set such that it is lower in the summer and higher in the winter in a way that would allow the amount of energy delivered to the grid to be consistent from month to month. The variable grid power limit may be varied such that it compensates for seasonal variations in the lengths of day.

Without an ESS, the daily pattern of power delivered to the grid may vary throughout the year when implementing the Grid-First Rule with a variable grid power limit, such that higher mid-day power levels and shorter period of power delivery each day in the winter is achieved, and lower mid-day power levels and a longer period of power delivery each day in the summer is achieved. In some cases, an ESS may be used to further modify a pattern in the daily power delivery.

Proportional Energy Splitting

In some cases, power generated by a RES may be allocated between a grid and an auxiliary process according to a predetermined proportion. In some cases, proportional energy splitting can be used to provide a consistent amount of energy delivered to the auxiliary process. In some cases, proportional energy splitting can be used to provide a consistent amount of energy delivered to the grid.

In some aspects, the present disclosure describes a method of adjusting energy delivered by a RES to (i) an electrical grid and (ii) an energy-consuming load, the method comprising: (a) determining a natural variability energy production schedule of the RES; and (b) adjusting the energy delivered by the RES by controlling a first amount of energy delivered to the electrical grid and a second amount of energy delivered to the energy-consuming load in a predetermined proportion relative to each other throughout a daily duration, such that a variability schedule of at least one of the first amount of energy or the second amount of energy is amplified or dampened over a time period relative to the natural variability energy production schedule of the RES. In some cases, the method does not require establishing a prioritization order between the electrical grid and the energy-consuming load such that one of the electrical grid or the energy-consuming load has a higher power use priority over the other. In some cases, the method does not require setting a power receiving threshold for the electrical grid or the energy-consuming load based on a prioritization order between the electrical grid and energy-consuming load.

During months when the energy generation of a RES is high, the predetermined proportion between the energy-consuming load (of an auxiliary process) and the grid can be weighted heavier towards the grid. During months when the energy generation of the RES is low, the predetermined proportion between the energy-consuming load and the grid can be weighted heavier towards the energy-consuming load. The predetermined proportion may be changed after a day, a week, a month, or any duration of time such that the energy delivered to the auxiliary process or the grid follows a desired pattern (for example, is consistent) each day, week, month, or any duration of time. In some cases, the predetermined proportion may be varied yearly, every 6 months, every 4 months, every 3 months, every 2 months, 1 month, every week, daily, hourly, every minute, or every second. In some cases, the predetermined proportion may be changed at any time and be operable for any duration of time until the predetermined proportion is changed to a new value. In some cases, the predetermined proportion may be used to provide flexible variability to the power or energy delivered to the grid or to the energy-consuming load.

For example, on a day in the month of April, one may use a predetermined proportion where 40% of energy generated by the RES would be allocated to the auxiliary process, and 60% to the grid. Then, the predetermined proportion could be adjusted each month, so that a consistent amount of energy is delivered to the auxiliary process each month.

In another example, on a day in the month of April, one may use a predetermined proportion such that 40% of energy generated by the RES would be delivered to the grid, and 60% to the auxiliary process. Then, the predetermined proportion could be adjusted each month, so that a consistent amount of energy is delivered to the grid each month.

Proportional energy splitting may have various advantages. In some cases, in the beginning and the ending parts of the period of daylight (when a solar RES is ramping or diminishing in power generation), the solar RES may use proportional energy splitting to simultaneously deliver energy to both the grid and the auxiliary process.

On the contrary, using the Grid-First Rule or the Auxiliary-First Rule with fixed power delivery limits may deliver energy to only one of the grid or the auxiliary process in the beginning and the ending parts of daylight, when the solar RES power generation is less than a fixed power delivery limit. Meanwhile, power delivered to the auxiliary process would be concentrated in the middle portion of the daylight period when the solar RES power generation is greater than a fixed power delivery limit.

Thus, proportional energy splitting may be advantageous when the method is employed in a geographic area where there is already too much solar RES power delivery to the grid in the middle of the day. In some cases, when compared to an Auxiliary-First Rule for example, proportional energy splitting may reduce mid-day energy delivered to the grid and increase early-day and late-day energy delivered to the grid. In some cases, proportional energy splitting may reduce the size requirements of an ESS for a solar DURES. In some cases, an ESS can be used shift energy generated in one part of the day to a different time of day for delivery to the grid.

Another advantage of proportional energy splitting can be that signal characteristics of power generation by the RES (e.g., high frequency noise, volatility, etc.) can be shared between the grid and the auxiliary process. This is advantageous in some circumstances over systems which allocate the volatility entirely to the grid or an auxiliary process.

In some aspects, the present disclosure describes a method of adjusting energy delivered by a RES to (i) an electrical grid and (ii) an energy-consuming load, the method comprising: (a) determining a natural variability energy production schedule of the RES; and (b) adjusting the energy delivered by the RES by controlling a first amount of energy delivered to the electrical grid and a second amount of energy delivered to the energy-consuming load in a variable ratio relative to each other throughout a plurality of durations, such that a variability schedule of at least one of the first amount of energy or the second amount of energy is amplified or dampened over a time period relative to the natural variability energy production schedule of the RES.

Figure 11A:
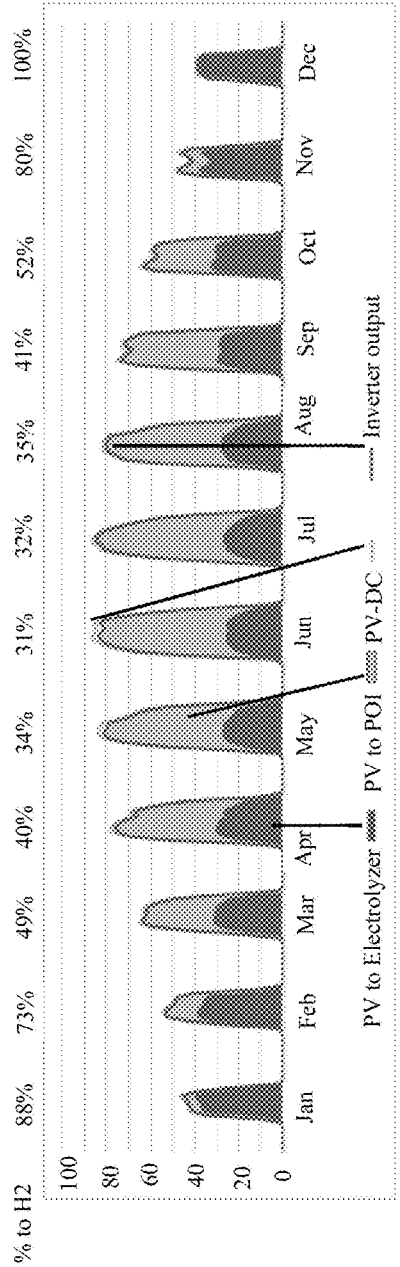
FIG. 11A shows a mean power generation and delivery in a 24-hour day in each month from a DURES implementing proportional energy splitting, in accordance with some embodiments.
Figure 11B:
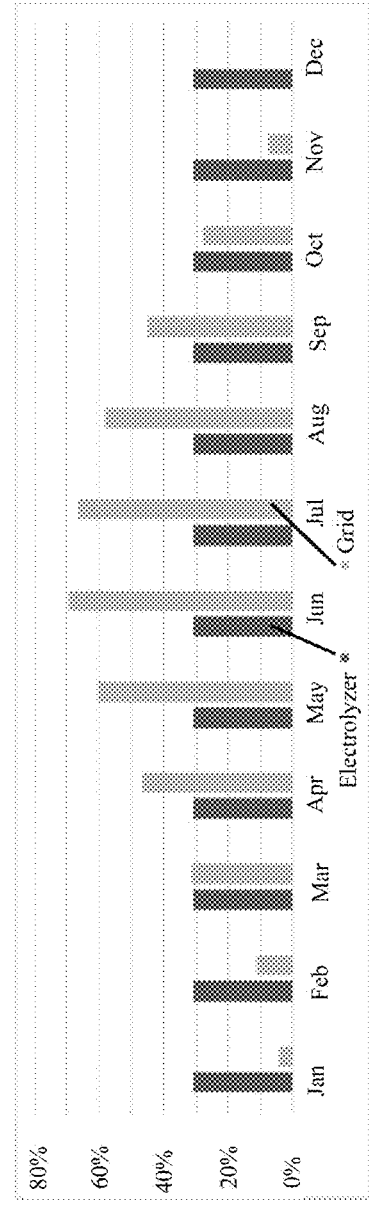
FIG. 11B shows a monthly energy generation and delivery of a DURES implementing proportional energy splitting, in accordance with some embodiments.

FIG. 11A shows an example mean power generation and delivery in a 24-hour day in each month from a DURES implementing proportional energy splitting, in accordance with some embodiments. The power delivered to the electrolyzer does not remain constant throughout the course of each day, but proportionally tracks the varying power output of the RES. In this example, the proportion of power delivered to the electrolyzer varies by month, so that in the winter months essentially all of the power from the RES is delivered to the electrolyzer, whereas in the summer months only a portion of the power from the RES is delivered to the electrolyzer. FIG. 11B shows a monthly energy generation and delivery of a DURES implementing proportional energy splitting, in accordance with some embodiments. In some cases, a DURES may split energy delivery proportionally between an electrolyzer (for hydrogen production) and the grid, where wherein the proportion varies on a monthly basis. In some cases, the energy being sent to the electrolyzer in each hour is a fixed percentage of the energy being produced by the RES in that hour. In some cases, the energy delivered to hydrogen production is substantially constant from month to month. The pattern of energy delivery may be adjusted to have any month-to-month pattern.

FIG. 12A shows a mean power generation and delivery in a 24-hour day in each month from a DURES implementing proportional energy splitting, in accordance with some embodiments. FIG. 12B shows a monthly energy generation and delivery of a DURES implementing proportional energy splitting, in accordance with some embodiments. In some cases, the DURES may make stable average daily energy deliveries to the grid over the course of a selected time period (e.g., the months of March through October), and deliver any excess energy production during those months to an electrolyzer to produce hydrogen. In some cases, the produced hydrogen can later be used to produce electricity over the course of another selected time period (e.g., winter months of November through February). As shown in FIG. 12A, when energy is delivered to the electrolyzer, the energy delivered in each hour may be a proportion of RES energy produced in that hour. Thus, power delivered to the electrolyzer in each hour may vary throughout the day. In some cases, the proportion may vary from month to month. In some cases, the average daily energy delivered to the grid may be substantially constant from the selected time period (e.g., March through November). In some cases, energy delivered to the electrolyzer may vary from month to month and may be highest in another time period (e.g., summer).

In some cases, the predetermined proportion may vary on a daily basis, such that the amount of energy delivered by the DURES to the grid or the auxiliary process is substantially constant from day to day. In some cases, the predetermined proportion may vary on a monthly basis, such that the amount of energy delivered by the DURES to the grid or the auxiliary process is substantially constant from month to month. In some cases, the predetermined proportion may be varied such that the amount of energy delivered may be substantially constant over the course of a selected time period of any duration. In some cases, the predetermined proportion may be varied such that the amount of energy delivered may be substantially the same as a predetermined delivery schedule over the course of a selected time period of any duration.

In some cases, the predetermined proportion may be varied by time of day (i.e., a variable ratio). Over the course of a selected time period (e.g., a month) the amount of energy that is to be delivered to the grid or the auxiliary process may be established. However, the amount of energy that is generated by the RES may fluctuate within a day due to various reasons (e.g., an overcast sky for a few hours in one day or a fraction of solar modules of the RES is disconnected for maintenance). In some cases, the proportion of power delivered to the grid could be reduced mid-day relative to the established value, with the proportion of power delivered to the auxiliary process being increased, in order to meet the established amount of energy that is to be delivered to the auxiliary process. Conversely, in some cases, the proportion of power delivered to the grid could be increased mid-day, relative to the established value, with the proportion of power delivered to the grid that is increased, in order to meet the established amount of energy that is to be delivered to the grid.

In some cases, the predetermined proportion of power or energy allocated to the grid could be increased at the start and/or at the end portions of daylight period, reducing (or making zero) the predetermined proportion of power/energy allocated towards the auxiliary process. Over the course of a day (when averaged across multiple days), the energy delivered to the grid or the auxiliary process would approximately match the established amount of energy to be delivered. Over a longer time period (e.g., weeks or months), the energy delivered to the grid or the auxiliary process may approximately match the established amount of energy to be delivered. In some cases, proportional energy splitting can reduce the size of an ESS needed to tune an intra-day profile of energy or power delivered to the grid and/or the auxiliary process while retaining a tuned variability of energy or power delivered to the grid and/or the auxiliary process.

Modifying Variability Using ESS

In some cases, power generated by a RES may be stored in an ESS to modify variability of energy delivered to the grid or the auxiliary process. In some cases, the ESS may deliver energy to the grid or the auxiliary process to lengthen the duration of time that energy is delivered. In some cases, the ESS may deliver energy to the grid or the auxiliary process to match the energy demand schedule of the grid or the auxiliary process. In some cases, the variability may be modified over a period of a day, a week, a month, or a year. Energy and/or power delivered to a load (e.g., an auxiliary load or a grid) may be delivered after being partly or entirely stored in an ESS, which can alter the timing of when the energy and/or power is delivered to the load. In some cases, such alteration can modify intra-day and/or inter-day energy and/or power delivery schedules.

Similarly, energy delivered to the electrolyzer may be delivered after timing adjustments implemented using an ESS. Methods and systems of modifying the variability using an ESS may be applied in combination with any other method or system disclosed herein.

Figure 10A:
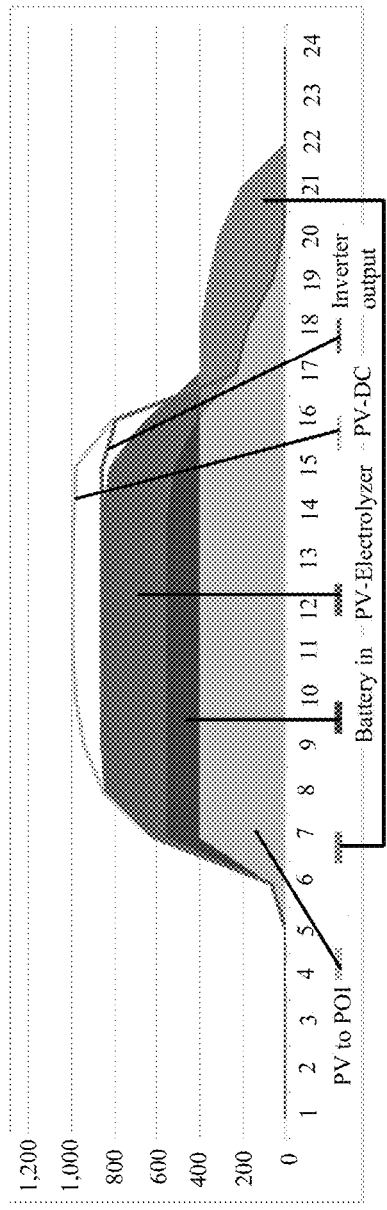
FIG. 10A shows a mean power generation and delivery in a representative 24-hour day from a DURES implementing a grid-first rule with an ESS to smooth daily power generation.

FIG. 10A shows a mean power generation and delivery in a representative 24-hour day from a DURES implementing a grid-first rule with an ESS to smooth daily power generation. In some cases, a portion of the energy directed to the grid may be stored in the ESS. In some cases, a portion of the excess amount of energy above a predetermined power delivery threshold to the grid may be stored in the ESS. In some cases, a fixed or variable proportion of the energy or power generated by an RES may be stored in the ESS. In some cases, a portion of energy generated may be stored in an ESS, which can be used to extend the period of time that energy is delivered to the grid. In some cases, the ESS may deliver energy to the grid such that a substantially constant amount of power is delivered to the grid, from the ESS and the RES combined.

Figure 10B:
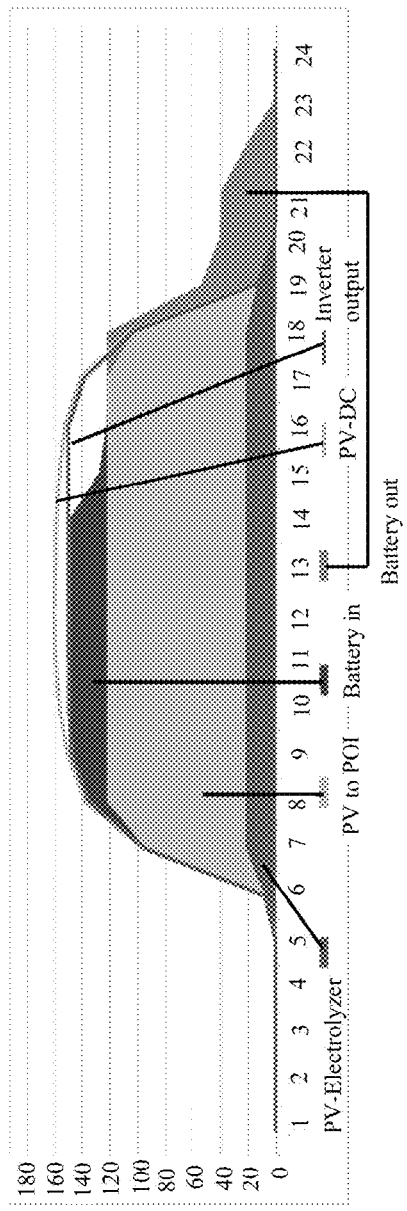
FIG. 10B shows a mean power generation and delivery in a representative 24-hour day from a DURES implementing an auxiliary-first rule with an ESS to smooth daily power generation.

FIG. 10B shows a mean power generation and delivery in a representative 24-hour day from a DURES implementing an auxiliary-first rule with an ESS to smooth daily power generation. In some cases, a portion of the excess amount of energy above a predetermined power delivery threshold to the auxiliary process may be stored in the ESS. In some cases, energy or power generated by the RES may be stored in the ESS for a predetermined duration of time. In some cases, the predetermined duration of time may be less than the duration of energy generation by the RES. In some cases, the ESS may deliver energy to the auxiliary process such that a substantially constant amount of power is delivered to the grid, from the ESS and the RES combined. In some cases, the ESS may deliver energy to the auxiliary process such that a variable amount of power is delivered to the grid, from the ESS and the RES combined.

Computer Systems

Figure 13:
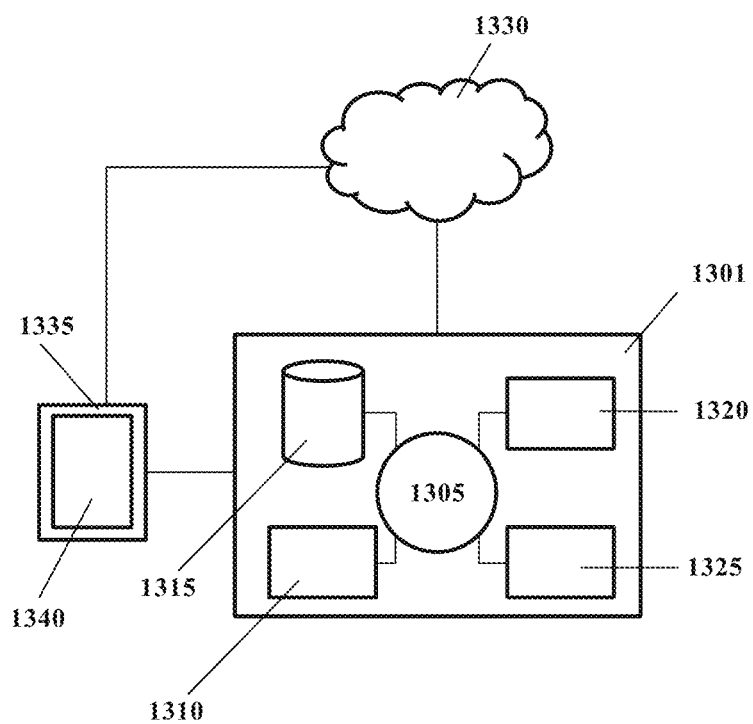
FIG. 13 schematically illustrates a computer system that is programmed or otherwise configured to implement methods provided herein.

The present disclosure provides computer systems that are programmed to implement methods of the disclosure. FIG. 13 shows a computer system 1301 that is programmed or otherwise configured to, for example, tune the variability of energy delivered to a grid or an auxiliary process.

The computer system 1301 may regulate various aspects of analysis, calculation, and generation of the present disclosure, such as, for example, tuning the variability of energy delivered to a grid or an auxiliary process. The computer system 1301 may be an electronic device of a user or a computer system that is remotely located with respect to the electronic device. The electronic device may be a mobile electronic device.

The computer system 1301 includes a central processing unit (CPU, also "processor" and "computer processor" herein) 1305, which may be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 may be a data storage unit (or data repository) for storing data. The computer system 1301 may be operatively coupled to a computer network ("network") 1330 with the aid of the communication interface 1320. The network 1330 may be the Internet, an internet and/or extranet, or an intranet and/or extranet that is in communication with the Internet.

The network 1330 in some cases is a telecommunication and/or data network. The network 1330 may include one or more computer servers, which may enable distributed computing, such as cloud computing. For example, one or more computer servers may enable cloud computing over the network 1330 ("the cloud") to perform various aspects of analysis, calculation, and generation of the present disclosure, such as, for example, tuning the variability of energy delivered to a grid or an auxiliary process. Such cloud computing may be provided by cloud computing platforms such as, for example, Amazon Web Services (AWS), Microsoft Azure, Google Cloud Platform, and IBM cloud. The network 1330, in some cases with the aid of the computer system 1301, may implement a peer-to-peer network, which may enable devices coupled to the computer system 1301 to behave as a client or a server.

The CPU 1305 may comprise one or more computer processors and/or one or more graphics processing units (GPUs). The CPU 1305 may execute a sequence of machine-readable instructions, which may be embodied in a program or software. The instructions may be stored in a memory location, such as the memory 1310. The instructions may be directed to the CPU 1305, which may subsequently program or otherwise configure the CPU 1305 to implement methods of the present disclosure. Examples of operations performed by the CPU 1305 may include fetch, decode, execute, and writeback.

The CPU 1305 may be part of a circuit, such as an integrated circuit. One or more other components of the system 1301 may be included in the circuit. In some cases, the circuit is an application specific integrated circuit (ASIC).

The storage unit 1315 may store files, such as drivers, libraries and saved programs. The storage unit 1315 may store user data, e.g., user preferences and user programs. The computer system 1301 in some cases may include one or more additional data storage units that are external to the computer system 1301, such as located on a remote server that is in communication with the computer system 1301 through an intranet or the Internet.

The computer system 1301 may communicate with one or more remote computer systems through the network 1330. For instance, the computer system 1301 may communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user may access the computer system 1301 via the network 1330.

Methods as described herein may be implemented by way of machine (e.g., computer processor) executable code stored on an electronic storage location of the computer system 1301, such as, for example, on the memory 1310 or electronic storage unit 1315. The machine executable or machine readable code may be provided in the form of software. During use, the code may be executed by the processor 1305. In some cases, the code may be retrieved from the storage unit 1315 and stored on the memory 1310 for ready access by the processor 1305. In some situations, the electronic storage unit 1315 may be precluded, and machine-executable instructions are stored on memory 1310.

The code may be pre-compiled and configured for use with a machine having a processer adapted to execute the code, or may be compiled during runtime. The code may be supplied in a programming language that may be selected to enable the code to execute in a pre-compiled or as-compiled fashion.

Aspects of the systems and methods provided herein, such as the computer system 1301, may be embodied in programming. Various aspects of the technology may be thought of as "products" or "articles of manufacture" typically in the form of machine (or processor) executable code and/or associated data that is carried on or embodied in a type of machine readable medium. Machine-executable code may be stored on an electronic storage unit, such as memory (e.g., read-only memory, random-access memory, flash memory) or a hard disk. "Storage" type media may include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 may include or be in communication with an electronic display 1335 that comprises a user interface (UI) 1340 for providing, for example, an interface for tuning the variability of energy delivered to a grid or an auxiliary process. Examples of UIs include, without limitation, a graphical user interface (GUI) and web-based user interface.

Methods and systems of the present disclosure may be implemented by way of one or more algorithms. An algorithm may be implemented by way of software upon execution by the central processing unit 1305. The algorithm can, for example, tune the variability of energy delivered to a grid or an auxiliary process.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure may be employed in practicing the present disclosure. It is intended that the following claims define the scope of the present disclosure and that methods and structures within the scope of these claims and their equivalents be covered thereby.

What is claimed is:

1. A method comprising:
   determining a first demand variability of an electrical grid load;
   determining a second demand variability of an energy-consuming load;
   determining a predicted power output of a renewable energy system (RES);
   establishing a prioritization order for the electrical grid load and the energy-consuming load by selecting one of the electrical grid load and the energy-consuming load based on the first and second demand variabilities;
   setting a power receiving threshold for the selected load for a duration of a month based on the prioritization order and the predicted power output of the RES and independent of a demand variability of the selected load, wherein the power receiving threshold represents a maximum amount of power to be delivered to the selected load throughout the duration of the month;
   during the duration of the month, directing a first amount of power from an RES output to the selected load based on the power receiving threshold, wherein the first amount of power has a substantially flat profile and a variability schedule with a variance of nearly zero; and
   during the duration of the month, directing a second amount of power from the RES output to the unselected load based on the power receiving threshold and the power output of the RES.

2. The method of claim 1 wherein the electrical grid load is given a lower priority than the energy-consuming load.

3. The method of claim 1, wherein the power receiving threshold is a fixed percentage or ratio of a maximum power output of the RES within a time period.

4. The method of claim 1, wherein the second amount of power comprises energy generated by the RES in excess of the power receiving threshold.

5. The method of claim 1, wherein the power receiving threshold causes a variability schedule of the first amount of power to have a lower variance than a variance of a natural variability power production schedule of the RES.

6. The method of claim 5, wherein the variability schedule of the first amount of power has a variance of nearly zero.

7. The method of claim 1 wherein the selected load is the energy-consuming load and the unselected load is the electrical grid.

8. The method of claim 1 wherein the selected load is the electrical grid and the unselected load is the energy-consuming load.

9. The method of claim 1 further comprising directing a third amount of power to an energy storage system (ESS).

10. The method of claim 9 further comprising directing a fourth amount of power from the ESS to the selected load.

11. The method of claim 10 wherein the fourth amount of power is combined with the power output of the RES to equal the power receiving threshold.

12. A system comprising:
a renewable energy system (RES); and
one or more inverters configured to:
during a duration of a month, direct a first amount of power from the RES to a selected load based on a power receiving threshold, wherein the selected load is selected based on a prioritization order, wherein the prioritization order is based on a comparison between a demand variability of the selected load and a demand variability of an unselected load, and wherein the power receiving threshold is set for the duration of the month based on the prioritization order and a predicted power output of the RES and independent of a demand variability of the selected load, wherein the power receiving threshold represents a maximum amount of power to be delivered to the selected load throughout the duration of the month, wherein the first amount of power has a substantially flat profile and a variability schedule with a variance of nearly zero; and
during the duration of the month, direct a second amount of power from the RES to the unselected load based on the power receiving threshold and a power output of the RES, wherein the unselected load is unselected based on the prioritization order.

13. The system of claim 12, wherein the selected load comprises an electrical power grid and the unselected load comprises an energy-consuming load.

14. The system of claim 12, wherein the selected load comprises an energy-consuming load and the unselected load comprises an electrical power grid.

15. The system of claim 14, wherein the energy-consuming load is an electrolyzer.

16. The system of claim 12, wherein the power receiving threshold is proportional to the power output of the RES.

17. The system of claim 12, wherein the power receiving threshold is a fixed percentage or ratio of a maximum power output of the RES within a time period.

18. The system of claim 12, wherein the second amount of power comprises energy generated by the RES in excess of the power receiving threshold.

19. The system of claim 12, wherein a variability schedule of the first amount of power has a lower variance than a variance of a natural variability power production schedule of the RES.

20. The system of claim 12, wherein the one or more inverters are further configured to direct a fourth amount of power from an energy storage system (ESS) to the selected load.

21. A non-transitory computer-readable storage medium having instructions stored thereon that, upon execution by a processor, cause the processor to perform operations comprising:
determining a first demand variability of an electrical grid load;
determining a second demand variability of an energy-consuming load;
determining a predicted power output of a renewable energy system (RES);
establishing a prioritization order for the electrical grid load and the energy-consuming load by selecting one of the electrical grid load and the energy-consuming load based on the first and second demand variabilities;
setting a power receiving threshold for the selected load for a duration of a month based on the prioritization order and the predicted power output of the RES and independent of a demand variability of the selected load, wherein the power receiving threshold represents a maximum amount of power to be delivered to the selected load throughout the duration of the month and is variable on a monthly basis;
during the duration of the month, directing a first amount of power from the RES to the selected load based on the power receiving threshold, wherein the first amount of power has a substantially flat profile and a variability schedule with a variance of nearly zero; and
during the duration of the month, directing a second amount of power from the RES to the unselected load based on the power receiving threshold and a power output of the RES.

22. The non-transitory computer-readable storage medium of claim 21, wherein the electrical grid load is given a lower priority than the energy-consuming load.

23. The non-transitory computer-readable storage medium of claim 21, wherein the power receiving threshold is a fixed percentage or ratio of a maximum power output of the RES within a time period.

24. The non-transitory computer-readable storage medium of claim 21, wherein the second amount of power comprises energy generated by the RES in excess of the power receiving threshold.

25. The non-transitory computer-readable storage medium of claim 21, wherein the power receiving threshold causes a variability schedule of the first amount of power to have a lower variance than a variance of a natural variability power production schedule of the RES.

26. The non-transitory computer-readable storage medium of claim 25, wherein the variability schedule of the first amount of power has a variance of nearly zero.

27. The non-transitory computer-readable storage medium of claim 21, wherein the selected load is the energy-consuming load and the unselected load is the electrical grid.

28. The non-transitory computer-readable storage medium of claim 21, wherein the selected load is the electrical grid and the unselected load is the energy-consuming load.

29. The non-transitory computer-readable storage medium of claim 21, wherein the operations further comprise directing a third amount of power to an energy storage system (ESS).

30. The non-transitory computer-readable storage medium of claim 29, wherein the third amount of power is based on a second power receiving threshold.

31. The non-transitory computer-readable storage medium of claim 29, wherein the operations further comprise directing a fourth amount of power from the ESS to the selected load.

32. The non-transitory computer-readable storage medium of claim 31, wherein the fourth amount of power is combined with the power output of the RES to equal the power receiving threshold.

33. A method comprising:
determining a first demand variability of a first load;

determining a second demand variability of a second load;
determining a predicted power output of a renewable energy system (RES);
determining a first proportion of power for the first load and a complementary second proportion of power for the second load based on the first and second demand variabilities and the predicted power output of the RES;
setting a first power threshold for the first load for a duration of a month based on the first proportion of power and the predicted power output of the RES;
setting a second power threshold for the second load for the duration of the month based on the second proportion of power and the predicted power output of the RES and independent of the demand variability of the second load, wherein the second power threshold represents a maximum amount of power to be delivered to the second load throughout the duration of the month;
during the duration of the month, directing a first amount of power from the RES to the first load based on the first power threshold; and
during the duration of the month, directing a second amount of power from the RES to the second load based on the second power threshold, wherein the second amount of power has a substantially flat profile and a variability schedule with a variance of nearly zero.

34. The method of claim 33, wherein the first load is an electrical grid and the second load is an energy-consuming load.

35. The method of claim 33, wherein the first load is an energy-consuming load and the second load is an electrical grid.

36. The method of claim 33, wherein the first proportion of power and the second proportion of power are determined in order to deliver a predetermined amount of power to either the first load or the second load.

37. The method of claim 33, wherein the first proportion of power and the second proportion of power are varied such that the first amount of power and the second amount of power follow a predetermined pattern.

* * * * *